US011203386B2

(12) United States Patent
Lee et al.

(10) Patent No.: US 11,203,386 B2
(45) Date of Patent: Dec. 21, 2021

(54) MAIN BUCK UNIT FOR VEHICLE BODY ASSEMBLING SYSTEM AND CONTROL METHOD OF THE SAME

(71) Applicants: Hyundai Motor Company, Seoul (KR); Kia Motors Corporation, Seoul (KR)

(72) Inventors: Junkyoung Lee, Gyeonggi-do (KR); Seon Woo Kweon, Ulsan (KR); Sangcho Kim, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/728,560

(22) Filed: Dec. 27, 2019

(65) Prior Publication Data

US 2020/0130760 A1 Apr. 30, 2020

Related U.S. Application Data

(62) Division of application No. 15/373,699, filed on Dec. 9, 2016, now abandoned.

(30) Foreign Application Priority Data

Sep. 7, 2016 (KR) .................. 10-2016-0115071

(51) Int. Cl.
*B62D 65/02* (2006.01)
*B62D 65/18* (2006.01)
(Continued)

(52) U.S. Cl.
CPC ........ *B62D 65/022* (2013.01); *B23K 37/0443* (2013.01); *B62D 65/026* (2013.01);
(Continued)

(58) Field of Classification Search
CPC .. B62D 65/022; B62D 65/024; B62D 65/026; B62D 25/02; B62D 65/02; B62D 65/18;
(Continued)

(56) References Cited

U.S. PATENT DOCUMENTS

| | | | |
|---|---|---|---|
| 2004/0143951 | A1 | 7/2004 | Berninger |
| 2010/0060042 | A1 | 3/2010 | Budek et al. |
| 2011/0265301 | A1 | 11/2011 | Kilibarda |
| 2015/0001279 | A1* | 1/2015 | Yao ...................... B62D 65/024 228/49.1 |

(Continued)

FOREIGN PATENT DOCUMENTS

| | | |
|---|---|---|
| CN | 104859754 A | 8/2015 |
| CN | 107719515 A | 2/2018 |

(Continued)

*Primary Examiner* — Matthew P Travers
(74) *Attorney, Agent, or Firm* — Mintz Levin Cohn Ferris Glovsky and Popeo, P.C.; Peter F. Corless

(57) ABSTRACT

A vehicle body assembling system forms a pre-buck section and a main buck section set along a transfer path of a floor assembly. A main buck unit is set at opposite sides of the transfer path in the main buck section, controls an upper portion of a side assembly in a state that a lower portion of each side assembly is pre-assembled to the floor assembly the pre-buck section, and assembles the upper portion of the side assembly and vehicle body parts using a second welding robot.

3 Claims, 17 Drawing Sheets

(51) Int. Cl.
*B23K 37/04* (2006.01)
*B23K 101/00* (2006.01)
*B23P 21/00* (2006.01)

(52) U.S. Cl.
CPC ........ *B62D 65/18* (2013.01); *B23K 2101/006* (2018.08); *B23P 21/004* (2013.01); *B23P 2700/50* (2013.01)

(58) Field of Classification Search
CPC ......... Y10T 29/49829; Y10T 29/49998; Y10T 29/53365; Y10T 29/53374; Y10T 29/534–53404; B60Y 2410/12; B60Y 2410/124; B23P 21/002; B23P 21/004; B23P 2700/50; B23K 37/0443; B23K 2101/006; B25B 11/02
See application file for complete search history.

(56) References Cited

U.S. PATENT DOCUMENTS

| | | |
|---|---|---|
| 2015/0167719 A1 | 6/2015 | Canute |
| 2017/0008582 A1 | 1/2017 | Brockhoff et al. |
| 2018/0043475 A1* | 2/2018 | Lee .................... B23K 37/0452 |
| 2020/0055149 A1* | 2/2020 | Lee ........................ B23K 31/02 |

FOREIGN PATENT DOCUMENTS

| | | |
|---|---|---|
| JP | 2015-027838 A | 2/2015 |
| KR | 10-0897267 B1 | 5/2009 |
| KR | 10-2009-0058240 A | 6/2009 |
| KR | 10-1305173 B1 | 9/2013 |
| KR | 10-1326816 B1 | 11/2013 |

* cited by examiner

MAIN BUCK UNIT FOR VEHICLE BODY ASSEMBLING SYSTEM AND CONTROL METHOD OF THE SAME

CROSS-REFERENCE TO RELATED APPLICATION

This application is a divisional of U.S. application Ser. No. 15/373,699, filed Dec. 9, 2016, which claims under 35 U.S.C. § 119(a) the benefit of Korean Patent Application No. 10-2016-0115071 filed in the Korean Intellectual Property Office on Sep. 7, 2016, the entire contents of which are incorporated herein by reference.

BACKGROUND

(a) Technical Field

The present disclosure relates to a vehicle body assembling system, more particularly, to a main buck unit for the vehicle body assembling system configured to assemble various types of vehicles in a vehicle body assembly line, and a method for controlling the same.

(b) Description of the Related Art

In general, a vehicle is formed in the shape of a white body (i.e., body in white, BIW) through a process of assembling various product panels produced in a vehicle body subprocess.

A vehicle body is formed of a floor panel that supports a driving portion such as an engine, an axle, a seat, and the like from a lower portion of a frame, opposite side panels that respectively form a left side and a right side of the frame, a roof panel that forms an upper surface of the frame, and a plurality of parts such as a cowl panel, a roof rail, a package tray, and a back panel. Assembly of the vehicle parts is performed through a main buck process (also referred to as a body build-up process in the relevant field).

In the main buck process, the back panel is bonded to the floor panel through the vehicle body assembling system, and then the opposite side panels, the cowl panel, the roof rail, the package tray, and the roof panel are assembled by welding.

For example, the vehicle body assembling system controls the side panels through a side hanger and a side gate, sets the side panel in the floor panel, sets the cowl panel, the roof rail, and the package tray in the side panel, and then welds a bonding portion of the parts through a welding robot.

A vehicle body assembling system according to a conventional art is provided with a rotation index (also referred to as a 4-sided rotator in the relevant field) that installs a vehicle-specific side gate in each of four sides. The 4-side rotation index rotates while controlling the vehicle-specific side panel through each of the side gates, and may place a side panel of the corresponding vehicle in the correct position at opposite sides of the floor panel.

Thus, while relevant parts (e.g., the cowl panel, the roof rail, and the package tray) are placed in the correct position in an upper end portion of the side panel that is controlled by the side gate of the 4-side rotation index, the upper end portion of the side panel, the relevant parts, a lower end portion of the side panel, and the floor panel may be welded using the welding robot in the conventional art.

In addition, in the conventional art, the entire frame of the vehicle body can be controlled at once through the vehicle-specific side gate of the 4-rotation index, and therefore the entire vehicle body assembling system may be increased in weight and size.

Further, since the vehicle-specific side gate is installed at each side of the 4-side rotation index in the conventional art, five or more different types of vehicle bodies cannot be assembled, and heavy and large-scale equipment needs to be additionally installed to assemble five or more different types of vehicle bodies.

The above information disclosed in this Background section is only for enhancement of understanding of the background of the disclosure and therefore it may contain information that does not form the prior art that is already known in this country to a person of ordinary skill in the art.

SUMMARY

Exemplary embodiments of the present disclosure provide a main buck unit for a vehicle body assembling system that can assemble at least five or more types of vehicles by separating a vehicle body assembly process into two processes rather than forming a frame of a vehicle body through a single process, and is capable of reducing the weight of the entire equipment, and a method for controlling the same.

A vehicle body assembling system includes a pre-buck unit in a pre-buck section and a main buck unit in a main buck section that are set along a transfer path of a floor assembly. According to the exemplary embodiment of the present disclosure, the main buck unit is set at opposite sides of the transfer path in the main buck section, and the vehicle body assembling system controls an upper portion of each side assembly in a state that a lower portion of each side assembly is pre-assembled to the floor assembly by the pre-buck unit in the pre-buck section, and assembles the upper portion of each side assembly and vehicle body parts using a second welding robot.

In addition, the vehicle body assembling system according to the exemplary embodiment of the present disclosure controls a vehicle width direction of the side assembly in the main buck section while the lower portion of each side assembly is welded to the floor assembly by the pre-buck unit, and welds the upper portion of the side assembly and the vehicle body parts using the second welding robot.

Further, the vehicle body assembling system according to the exemplary embodiment of the present disclosure may include a loading portion (e.g., a CRP loading portion, referring to a cowl, a roof rail, and a package tray) that controls the vehicle body parts that include a cowl, a roof rail, and a package tray, and places the vehicle body parts in regular positions in the upper portion of the side assembly.

The main buck unit may include a plurality of side jigs that control an upper portion of a side assembly that is different depending on a type of a vehicle, and a 4-sided rotation index that fixes the side jig.

The main buck unit detachably may couple the side jig with respect to the rotation index by using a handling robot.

According to another exemplary embodiment of the present disclosure, a main buck unit is provided in a vehicle body assembling system that sets a pre-buck section and a main buck section along a transfer path of a floor assembly and forms a pre-buck unit in the pre-buck section. The main buck unit is formed in the main buck section, and includes: a plurality of side jigs detachably mounted to a handling robot in the main buck section and controlling an upper portion of a side assembly that is different depending on a type of a vehicle; a rotation index coupled with the side jig in the main buck section, that is rotatable by a predetermined angle, and that is provided to be reciprocatively movable along a vehicle width direction at opposite sides of the transfer path; and at least one second welding robot provided in the main buck section and welding the upper portion of the side assembly and vehicle body parts.

The main buck unit may include a loading portion (e.g., a CRP loading portion) provided to be movable along the transfer path in an upper side of the transfer path and being elevatable in the main buck section.

The CRP loading portion may control the vehicle body parts that include a cowl, a roof rail, and a package tray, and may place the vehicle body parts in regular positions in the upper portion of the side assembly.

A storage portion may be provided in the main buck section to store the plurality of side jigs.

Each of the side jigs may include: a jig frame mounted to an arm front end of the handling robot in the min-buck section; a plurality of third clampers provided in the jig frame, clamping the upper portion of the side assembly, and controlling a vehicle width direction of the side assembly; and a plurality of second coupling pins provided in the jig frame and coupled with the rotation index.

The second coupling pin may form a round-shaped second ball coupling groove along a circumferential direction thereof.

The rotation index may include: second movement members provided to be reciprocatively movable along a vehicle width direction by a driver in main buck frames at opposite sides of the transfer path; a pair of index frames provided at a distance from each other on the second movement member; a rotator including four sides where the side jigs that are different depending on a type of the vehicle are detachably coupled and rotatably provided in the index frame by the driver; a plurality of jig coupling portions provided in the respective sides of the rotator and pin-coupled with the side jigs; and a plurality of fourth clampers provided in the respective sides of the rotator and fixing the side jigs to the rotator.

The jig coupling portion may be provided with a triangular structure in each side of the rotator.

The jig coupling portion may include: a second pin housing to which a second coupling pin provided in the side jig is fitted; and a second ball clamp provided in the second pin housing and clamping the second coupling pin using a plurality of balls.

The second ball clamp may include a pair of second race members where the balls are rollably provided, and may be provided to be movable to a center from an outer side of a circumferential direction of the second coupling pin by the driver.

The second coupling pin may form a round-shaped second ball coupling groove along a circumferential direction thereof.

The balls may be coupled to the second ball coupling grooves by the second race members.

In the index frame, a second location sensor that senses a location of the side assembly and controls a driver of the second movement member according to a sense signal may be provided.

A vehicle type tag may be provided in the side jig and a tag reader may be provided in each side of the rotator.

According to another exemplary embodiment of the present disclosure, a method for controlling a main buck unit for a vehicle body assembling system is provided. The method includes: receiving, by a tag reader, vehicle type information of side jigs coupled to four sides of a rotation index; determining, by a controller, whether a side jig that corresponds to a type of a next vehicle to be produced in addition to the side jig of the type of a vehicle that is currently produced is coupled to the rotation index; when it is determined that a side jig of a type of the next vehicle to be produced is not coupled to the rotation index, separating the side jig mounted to an upper side of the rotation index and unloading the separated side jig in a storage portion in assembling of a side assembly of the type of the vehicle that is currently produced; and selecting, by the controller, a side jig of a type of the next vehicle to be produced from the storage portion, and coupling the selected side jig to the upper side of the rotation index when the rotation index is moved backward after finishing assembly of the side jig of the type of the vehicle that is currently produced.

When it is determined that the side jig of the type of the next vehicle to be produced is coupled to the rotation index, the side assembly of the type of the vehicle that is currently produced and a side assembly of the type of the next to be produced vehicle may be assembled by rotating the rotation index and moving the rotation index back and forth.

A tag reader provided in each side of the rotation index may receive vehicle type information stored in a vehicle type tag provided in the side jig.

According to the exemplary embodiments of the present disclosure, the lower portion of the side assembly is pre-assembled to the floor assembly using the pre-buck unit in the pre-buck section, and then the upper portion of the side assembly and the vehicle body parts can be assembled by the main buck unit in the main buck section.

Thus, according to the exemplary embodiment of the present disclosure, the main buck unit for the vehicle body assembling system that can assemble at least five or more types of vehicles by separating a vehicle body assembly process into two processes rather than forming a frame of a vehicle body through a single process as in a conventional art, and is capable of reducing the weight of the entire equipment, and a method for controlling the same are provided.

Accordingly, various types of vehicles can be produced, equipment preparation time can be reduced, the entire equipment can be light-weight and simplified, and initial investment cost and additional investment cost due to addition of different types of vehicles can be saved.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION OF THE EMBODIMENTS

Figure 1:
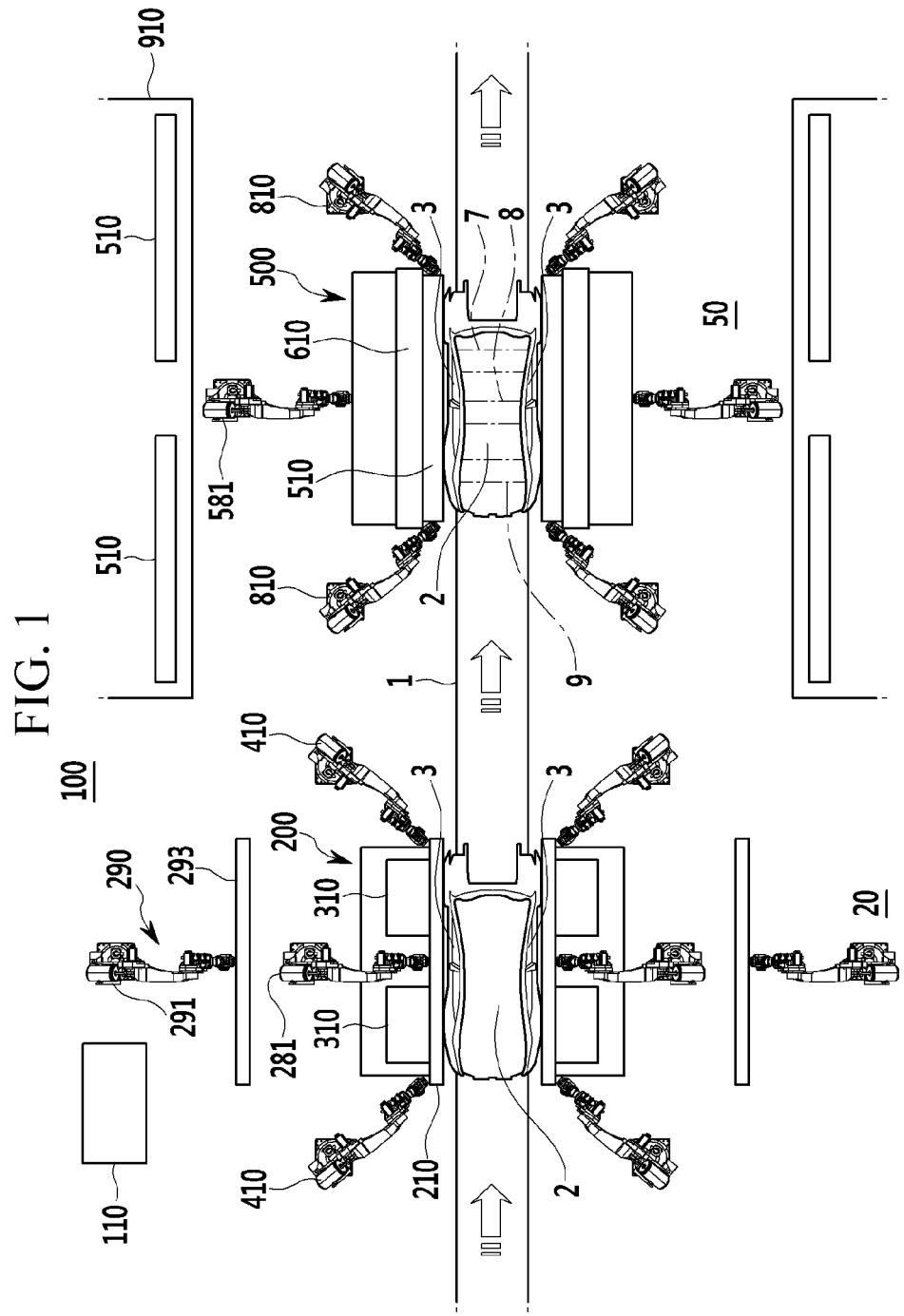
FIGS. 1 and 2 are schematic diagrams of a vehicle body assembling system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present disclosure will be described more fully with reference to the accompanying drawings, in which exemplary embodiments of the disclosure are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

Figure 2:
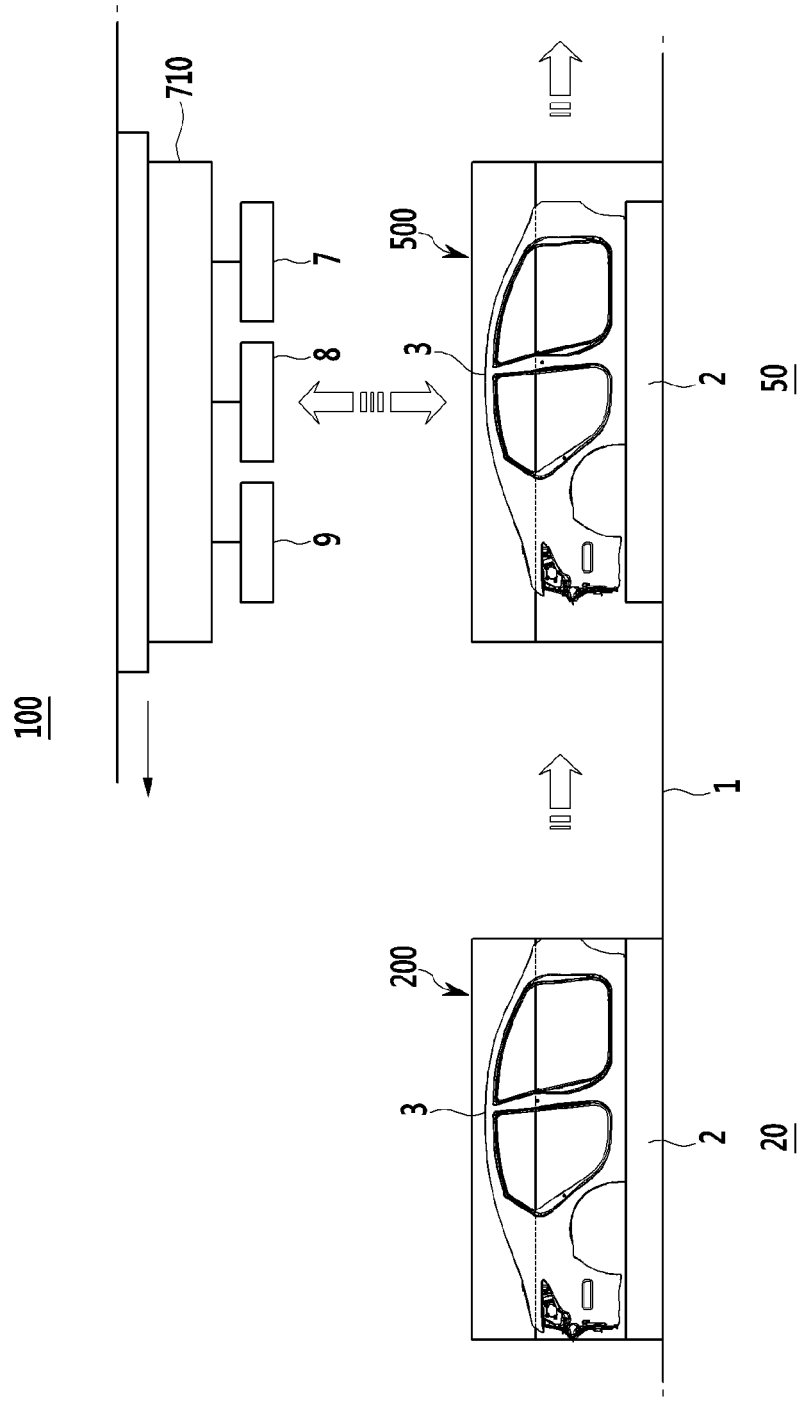

FIGS. 1 and 2 are schematic diagrams of a vehicle body assembling system according to an exemplary embodiment of the present disclosure.

Referring to FIGS. 1 and 2, a vehicle body assembling system 100 according to the exemplary embodiment of the present disclosure may be applied to a vehicle body assembly line through which assembly parts of a vehicle body, conveyed through a vehicle body subassembly line, are welded and assembled as a complete vehicle body.

The vehicle body assembly line includes a main process for assembling a floor assembly, which is a base of the vehicle body, a side process for assembling side assemblies, which are wall parts of the vehicle body, and a main buck process for assembling the side assemblies to the floor assembly and assembling a cowl, a roof rail, and a package tray to the side assemblies.

Here, the main buck process is a process for fixing a welding fixture using large-scale equipment, swinging, rotating, and shifting the welding fixture, and integrally assembling a side body assembly and an underbody.

The vehicle body assembling system 100 according to the exemplary embodiment of the present disclosure may be applied to the main buck process that assembles the floor assembly, the side assemblies, the cowl, the roof rail, and the package tray by spot welding equipment using a robot in the vehicle body assembly line.

Hereinafter, an example of bonding the side assemblies to opposite sides of the floor assembly and bonding the cowl, the roof rail, and the package tray to the side assemblies will be described in the main buck process.

That is, the vehicle body assembling system 100 according to the exemplary embodiment of the present disclosure may assemble side assemblies 3 to opposite sides of a floor assembly 2 that is conveyed along a transfer path set along a truck line 1, and may assemble a cowl 7, a roof rail 8, and a package tray 9 to the side assemblies 3.

In the exemplary embodiment of the present disclosure, a transfer direction of the floor assembly 2 is defined as a vehicle body transfer direction, and the vehicle body transfer direction is called a T direction, a vehicle width direction is called an L direction, and a height direction of the vehicle body is called an H direction in the relevant field. However, in the exemplary embodiment of the present disclosure, the L, T, and H directions are respectively defined as a vehicle body transfer direction, a vehicle width direction, and a vehicle body height direction.

The vehicle body assembling system 100 according to the exemplary embodiment of the present disclosure does not form a frame of the vehicle body through a single process, but separates a vehicle body assembly process into two processes such that at least 5 or more different types of vehicle bodies can be assembled and the entire equipment can be light-weight.

In particular, the vehicle body assembling system 100 according to the exemplary embodiment of the present disclosure sets a pre-buck section 20 and a main buck section 50 partitioned along the transfer path.

In addition, the vehicle body assembling system 100 according to the exemplary embodiment of the present disclosure basically includes a pre-buck unit 200 provided in the pre-buck section 20 and a main buck unit 500 provided in the main buck section 50.

The pre-buck unit 200 and the main buck unit 500 may be respectively provided in one frame in each of the pre-buck section 20 and the main buck section 50, or may be provided in each frame.

Such a frame is provided to support the above-stated constituent elements, and is equipped with various components such as various brackets, a support block, a plate, a housing, a cover, a collar, and the like. However, the components are provided to install the constituent elements to the frame, and will be collectively referred to as a frame in the exemplary embodiment of the present disclosure, except for exceptional cases.

In the exemplary embodiment of the present disclosure, the pre-buck unit 200 controls a lower portion of the side assembly 3, which is different depending on a type of a vehicle, with respect to opposite sides of the floor assembly 2, and pre-assembles the lower portion of each of the side assemblies 3 to the floor assembly 2. Such a pre-buck unit 200 is provided in each of the opposite sides of the transfer path of the truck line 1 in the pre-buck section 20.

Figure 3:
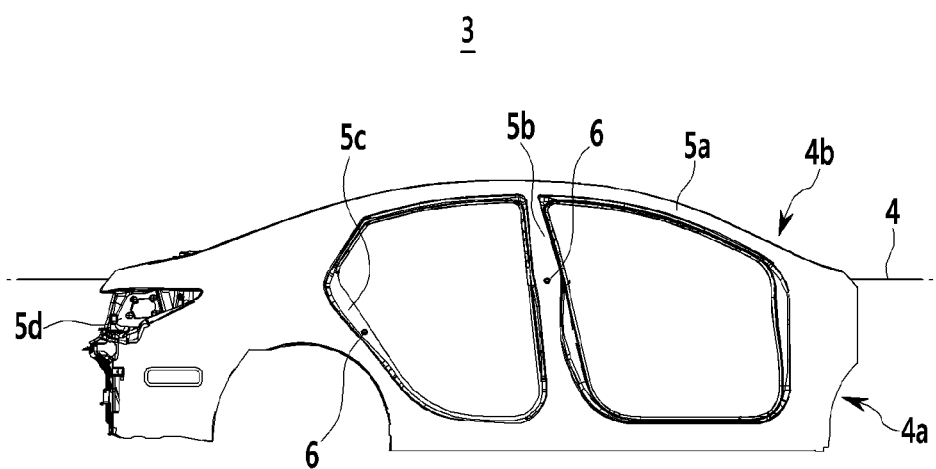
FIG. 3 shows a side assembly applied to the vehicle body assembling system according to the exemplary embodiment of the present disclosure.

Meanwhile, in the exemplary embodiment of the present disclosure, as shown in FIG. 3, each of the side assemblies 3 may be divided into a lower portion 4a and an upper portion 4b with reference to a dotted reference line 4. In addition, the side assembly 3 forms a front pillar 5a, a center pillar 5b, a rear pillar 5c, and a rear combination lamp portion 5d. Further, the side assembly 3 forms at least one reference hole 6 for placing the side assembly 3 in the correct position.

Figure 4:
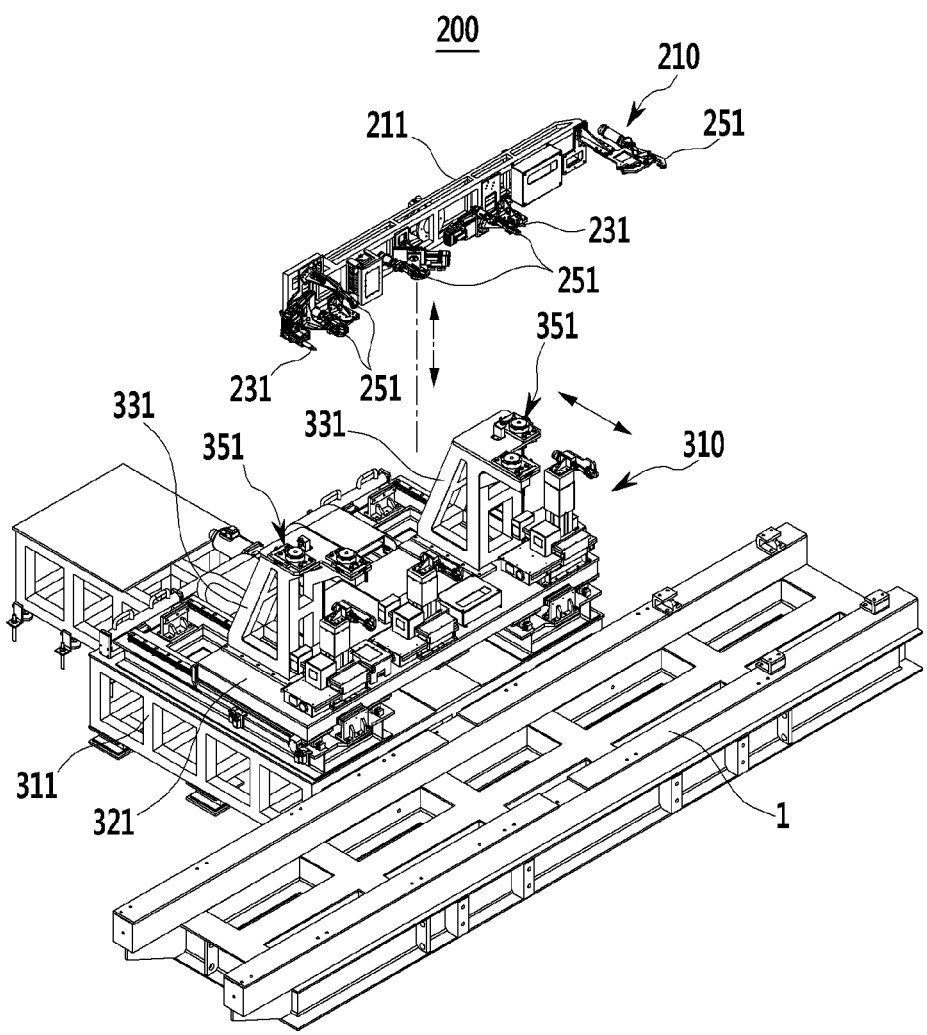
FIG. 4 is a perspective view of a pre-buck unit applied to the vehicle body assembling system according to the exemplary embodiment of the present disclosure.

FIG. 4 is a perspective view of the pre-buck unit applied to the vehicle body assembling system according to the exemplary embodiment of the present disclosure.

Referring to FIGS. 1 and 4, the pre-buck unit 200 according to the exemplary embodiment of the present disclosure includes a side hanger 210, a guide post 310, and a plurality of first welding robots 410 for controlling a transfer direction and a height direction of the vehicle body of the side assembly 3 and pre-assembling the lower portion 4a (see FIG. 3) of each side assembly 3 to the floor assembly 2.

Here, the pre-assembling implies not a setting assembly performed by locating the side assembly 3 at the floor assembly 2 of the vehicle body but a welding assembly performed by welding the lower portion of the side assembly 3 to the floor assembly 2.

In the exemplary embodiment of the present disclosure, the side hanger 210 clamps or grips the lower portion 4a of the side assembly 3, which is different depending on a vehicle type, so as to control a transfer direction of the height direction of the side assembly 3.

Such a side hanger 210 may be provided as a common hanger that can commonly control the lower portion 4a of the side assembly 3, which is different depending on a vehicle type, at a regular position. The side hanger 210 is mounted to a first handling robot 281 in the pre-buck section 20.

Meanwhile, the side hanger 210 may control the lower portion 4a of the side assembly 3 to be aligned in the predetermined position using an additional alignment means in the pre-buck section 20. For this, the pre-buck unit 200 according to the exemplary embodiment of the present disclosure includes a robot hanger 290 as shown in FIG. 1.

The robot hanger 290 may unload the side assemblies 3 transferred to the pre-buck section 20 through a transfer hanger 110, and may load the unloaded side assemblies 3 to the side hanger 210 using a robot-to-robot method while the side assemblies 3 are aligned in the predetermined position.

The robot hanger 290 includes an alignment jig 293 mounted to a front end of an arm of a hanger robot 291. The alignment jig 293 aligns the side assembly 3 in the predetermined position, and may set a reference location of the side assembly 3, support an edge portion of the side assembly 3, and clamp the edge portion. Such an alignment jig 293 is a known alignment jig in the relevant field, and therefore further detailed description will be omitted.

Figure 5:
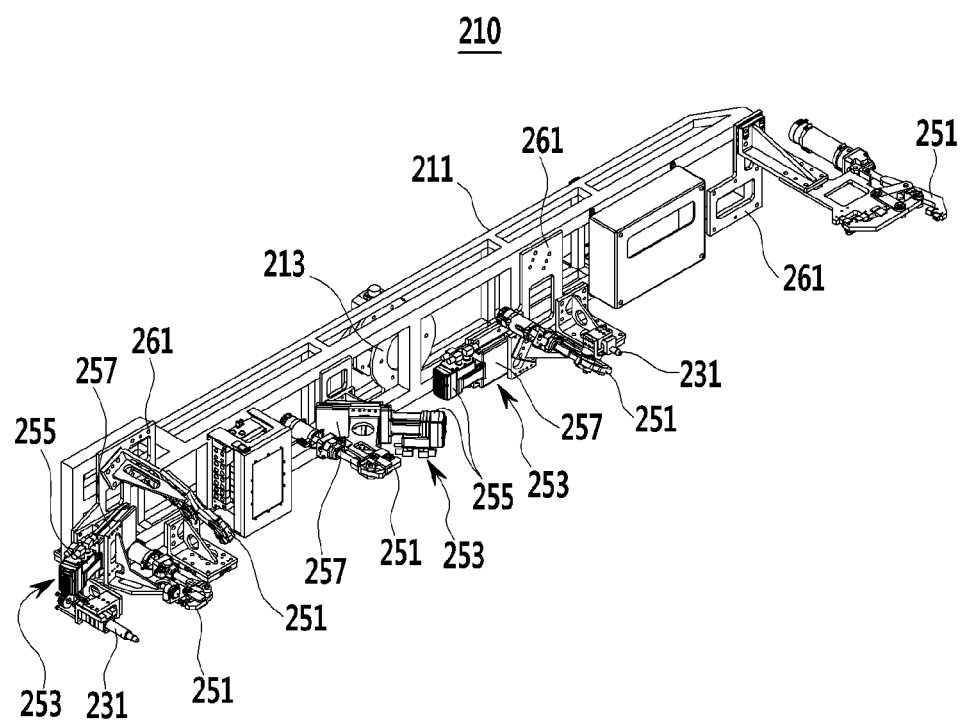
FIGS. 5 and 6 are perspective views of a side hanger applied to the pre-buck unit of the vehicle body assembling system according to the exemplary embodiment of the present disclosure.
Figure 6:
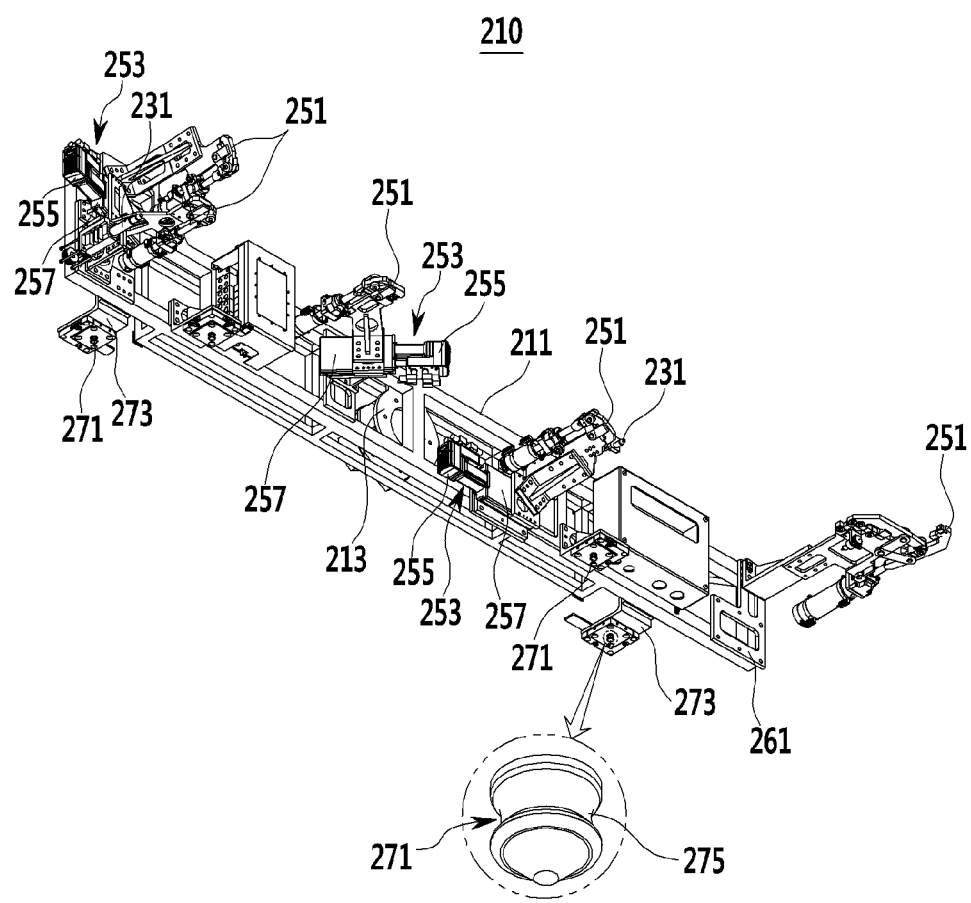

FIGS. 5 and 6 are perspective views of the side hanger applied to the pre-buck unit of the vehicle body assembling system according to the exemplary embodiment of the present disclosure.

Referring to FIGS. 4 to 6, the side hanger 210 according to the exemplary embodiment of the present disclosure basically includes a hanger frame 211, a reference pin 231, a first clamper 251, and a first coupling pin 271.

The hanger frame 211 is mounted to an arm front end of the first handling robot 281 (see FIG. 1) that is provided in the pre-buck section 20 (see FIG. 1). The hanger frame 211 may be mounted to the arm front end of the first handling robot 281 or may be separated from the arm front end through a tool changer 213.

The reference pin 231 sets the reference position of the side assembly 3, and at least one reference pin 231 is provided in the hanger frame 211. The reference pin 231 is pinned in the reference hole 6 of the side assembly 3 as shown in FIG. 3.

The reference pin 231 may move forward and backward in a front side of the hanger frame 211 using a driving means of the reference pin 231, and may be pinned into the reference hole 6 of the side assembly 6. Further, the reference pin 231 may change its locations in three directions, that is, the transfer direction, the vehicle width direction, and the height direction by the driving means corresponding to the reference hole 6 of the side assembly 3, which may be different depending on a vehicle type.

The first clamper 251 clamps only the lower portion 4a of the side assembly 3, and is provided in plural to control the vehicle body transfer direction and the height direction of the side assembly 3.

The first clampers 251 are respectively provided in opposite end portions of the hanger frame 211, and are provided in plural between the opposite end portions. The first clampers 251 respectively provided at the opposite end portions of the hanger frame 211 may respectively clamp a front side and a rear side (i.e., a rear combination lamp portion) of the side assembly 3. The first clampers 251 at the opposite end portions of the hanger frame 211 are provided therein in a fixed manner.

In addition, the plurality of first clampers 251 provided between the opposite end portions of the hanger frame 211 may clamp the front pillar 5a, the center pillar 5b, and the rear pillar 5c of the side assembly 3 shown in FIG. 3.

Here, the first clampers 251 that correspond to the front pillar 5a, the center pillar 5b, and the rear pillar 5c of the side assembly 3 are reciprocally provided along the vehicle body transfer direction by a first driver 253 such that the locations of the first clampers 251 become variable.

The first driver 253 moves the first clampers 251 in the vehicle body transfer direction according to locations of pillars of the side assemblies 3, which are different depending on a vehicle type. For example, the first driver 253 may reciprocally move the first clampers 251 in the vehicle body transfer direction through a known first guide structure 257 that is provided with a lead (or a ball) screw and a guide rail to convert a rotation force of a first servomotor 255 to a linear movement.

In this case, the first clampers 251 may be provided in a triangular structure so as to stably grip the lower portion of the side assembly 3 with reference to the center of the side assembly 3.

Further, a plurality of installation left sides 261 are provided in the hanger frame 211 for additionally installing the first clampers 251 corresponding to the side assemblies 3 that are different depending on a vehicle type.

The above-stated fixed or location-variable first clampers 251 may be mounted to the installation left sides 261 corresponding to the side assemblies 3 that are different depending on a vehicle type.

The first coupling pins 271 are provided to couple the hanger frame 211 that controls the lower portion 4a of the side assembly 3 through the first clampers 251 to the guide post 310 from the back.

The first coupling pins 271 are provided in plural in a rear lower portion of the hanger frame 211. The first coupling pins 271 are mounted to the rear lower portion of the hanger frame 211 through a first installation bracket 273. The first coupling pints 271 protrude in a lower direction in the first installation bracket 273.

The first coupling pin 271 forms a first ball coupling groove 275 along a circumference direction with a cylinder shape. A coupling structure of the first coupling pin 271 and the guide post 310 will be described later in detail.

Figure 7:
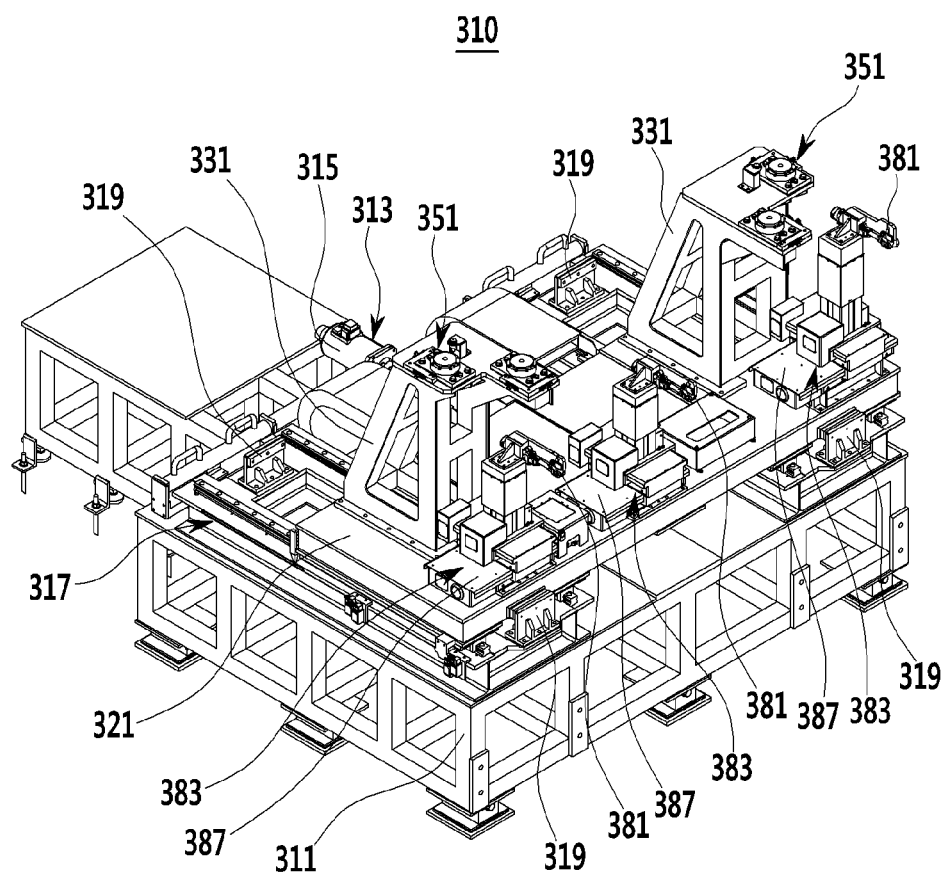
FIG. 7 is a perspective view of a guide post applied to the pre-buck unit of the vehicle body assembling system according to the exemplary embodiment of the present disclosure.

FIG. 7 is a perspective view of the guide post applied to the pre-buck unit of the vehicle body assembling system according to the exemplary embodiment of the present disclosure.

Referring to FIGS. 4 and 7, the guide post 310 according to the exemplary embodiment of the present disclosure is coupled with the side hanger 210 that controls the side assembly 3 in the pre-buck section 20, and precisely matches the side assemblies 3 to the opposite sides of the floor assembly 2 (see FIG. 1).

Further, the guide post 310 according to the exemplary embodiment of the present disclosure controls location variation of the side assembly 3, which may occur when the first handling robot 281 handles the side hanger 210 that controls the side assembly 3, and minimizes assembly variation of the side assemblies 3 with respect to the opposite sides of the floor assembly 2.

The guide post 310 is provided in each of the opposite sides of the transfer path of the truck line 1 (see FIG. 1) in the pre-buck section 20, is coupled with the side hanger 210 through the first handling robot 281, and is reciprocally provided in the vehicle width direction with respect to the opposite sides of the floor assembly 2.

The guide post 310 may be reciprocally movable in the vehicle width direction in a pre-buck frame 311 at the opposite sides of the transfer path of the pre-buck section 20. Such a guide post 310 includes a first movement member 321, a post frame 331, and a hanger coupling portion 351.

The first movement member 321 is provided to be reciprocative along the vehicle width direction with respect to the opposite sides of the floor assembly 2 through a second driver 313 in the pre-buck frame 311 at the opposite sides of the transfer path. For example, the first movement member 321 is provided with a plate shape, and is reciprocative along the vehicle width direction by the second driver 313 in the upper side of the pre-buck frame 311.

Here, the second driver 313 is provided to make the first movement member 321 be reciprocative along the vehicle width direction. The second driver 313 can make the first movement member 321 reciprocative along the vehicle width direction using a second guide structure 317 which is a known structure and is provided with a lead (or a ball) screw and a guide rail that convert a rotation force of the second servomotor 315 to linear movement.

Such a second driver 313 is provided as an electric driver or a moving device which is well known in the field, and therefore no further detailed description will be provided.

The pre-buck frame 311 may be provided with a first stopper 319 that determines a regular position of the first movement member 321 that moves along the vehicle width direction by the second driver 313. The first stopper 319 may be provided in each of opposite ends of the guide rail in the pre-buck frame 311.

The post frame 331 provided as a pair is substantially coupled with the side hanger 210 through the first handling robot 281, and the pair of post frames 331 are disposed at a distance from each other in the vehicle body transfer direction on the first movement member 321.

Such a post frame 331 is provided with a structure in which a plurality of metal bars are connected in the vehicle body transfer direction, the vehicle width direction, and the height direction, and the post frames 331 may be perpendicularly disposed at a distance from each other along the vehicle body transfer direction on the first movement member 321. The post frames 331 respectively include mounting surfaces formed on upper surfaces thereof such that the side hanger 210 can be mounted on the mounting surfaces of the post frames 331.

As shown in FIGS. 5 and 6, the hanger coupling portion 351 couples the hanger frame 211 of the side hanger 210, which controls the side assembly 3 through the first clampers 251, to the post frames 331.

The hanger coupling portion 351 is provided in plural, and the plurality of hanger coupling portions 351 are respectively provided in the mounting surfaces of the post frames 331. The hanger coupling portion 351 is pin-coupled with the first coupling pin 271 provided in the hanger frame 211 to clamp the first coupling pin 271.

Figure 8:
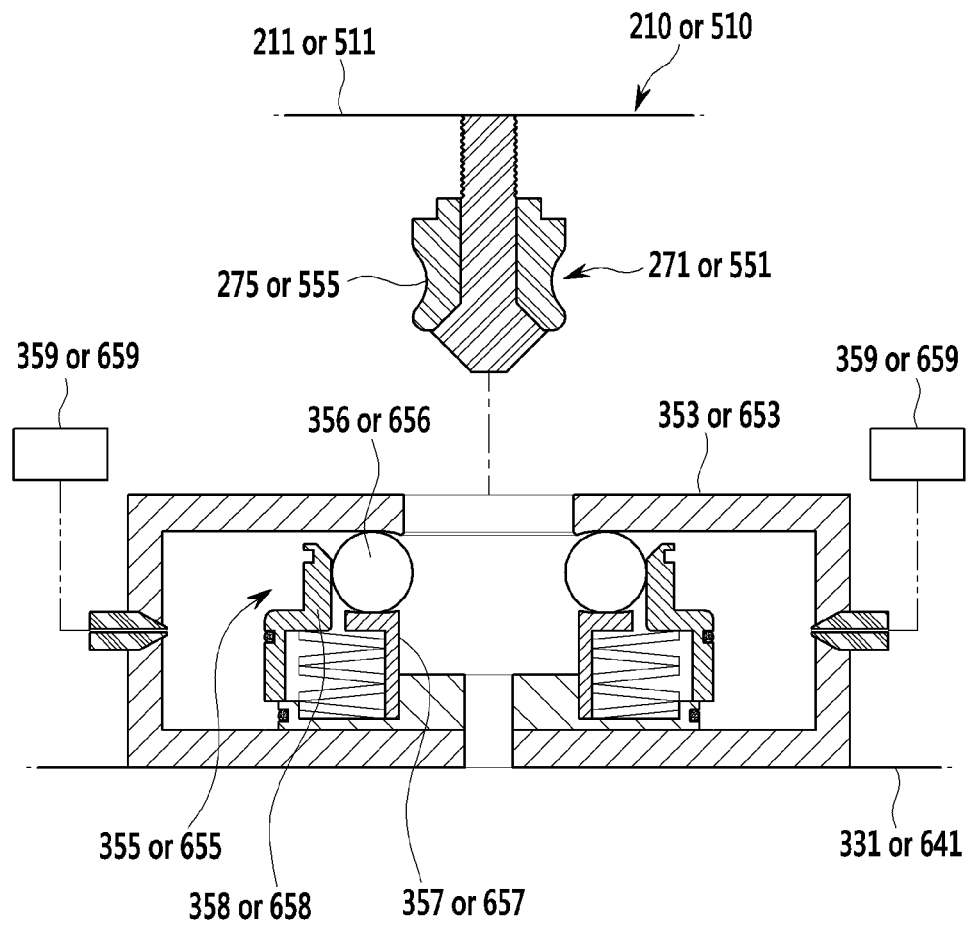
FIGS. 8 and 9 schematically illustrate a hanger combining portion of the guide post applied to the pre-buck unit and a zigzag combining portion of a rotation index applied to the main buck unit of the vehicle body assembling system according to the present disclosure.
Figure 9:
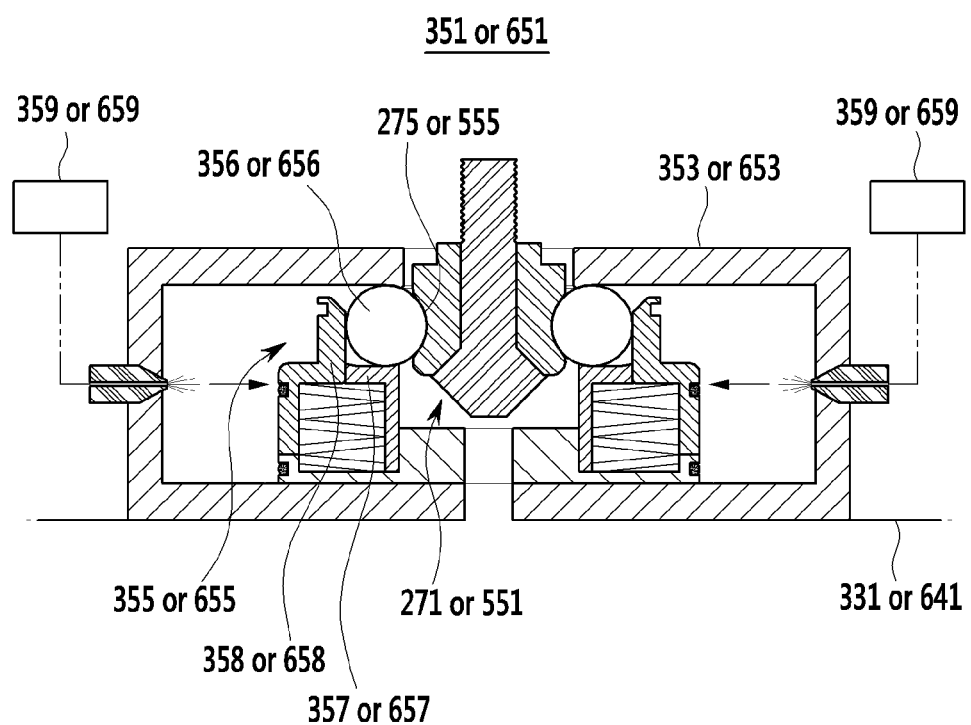

FIGS. 8 and 9 schematically show the hanger coupling portion of the guide post applied to the pre-buck unit of the vehicle body assembling system according to the exemplary embodiment of the present disclosure.

Referring to FIGS. 8 and 9, along with FIGS. 5 and 6, the hanger coupling portion 351 according to the exemplary embodiment of the present disclosure includes a first pin housing 353 and a first ball clamp 355.

The first pin housing 353 is provided to be fixed to the mounting surface of the post frame 331. The first coupling pin 271 of the side hanger 210 is fitted into the first pin housing 353.

The first ball clamp 355 is provided in the first pin housing 353 and clamps the first coupling pin 271 fitted into the first pin housing 353 with a plurality of balls 356 and air pressure.

For example, the first ball clamp 355 includes a support race 357 that supports the balls 356 to be rollable, a pair of first race members 358 provided to be movable to the center from an outer side of the circumferential direction of the first coupling pin 271, and a third driver 359 that provides a driving pressure to the first race member 358.

The support race 357 is provided as a circular race that supports the balls 356 to be rollable, and the pair of first race members 358 serve to press the balls 356 while moving to the center from the outer side of the circumferential direction of the first coupling pin 271.

In addition, the third driver 359 provides air pressure to the first race member 358, and is provided as an air supply source that presses the balls 356 while moving to the center from the outer side of the circumferential direction of the first coupling pin 271.

As shown in FIG. 8, when the first coupling pin 271 is not coupled to the first pin housing 353, air pressure is not supplied to the first race member 358 through the third driver 359, and in this case, the balls 356 maintain a free-rollable state in the support race 357.

In addition, as shown in FIG. 9, when the first coupling pin 271 is coupled to the first pin housing 353, the air pressure is supplied to the first race member 358 through the third driver 359 such that the first race member 358 presses the balls 356 on the support race 357 while moving to the center from the outer side of the circumferential direction of the first coupling pin 271.

Accordingly, the balls 356 are coupled to the first ball coupling groove 275 of the first coupling pin 271 such that the first coupling pin 271 can be firmly fixed to the first pin housing 353.

Thus, in the exemplary embodiment of the present disclosure, the first coupling pin 271 of the side hanger 210 is clamped by the hanger coupling portion 351 using a ball clamping method such that the side hanger 210 can be coupled to the post frame 331.

In the drawings, there are four hanger coupling portions 351 provided in the post frames 331 (i.e., two hanger coupling portions 351 for each post frame 331), but this is not restrictive. Three hanger coupling portions 351 may be provided in the post frames 331.

Alternatively, the hanger coupling portion 351 may be provided with a triangle structure in the post frames 331 so as to stably couple the side hanger 210 to the post frames 331.

Meanwhile, in the exemplary embodiment of the present disclosure, the side assemblies 3 may be moved to the opposite sides of the floor assembly 2, respectively, by the first movement members 321 while the side hangers 210 that control the side assemblies 3 are being respectively coupled to the hanger coupling portions 351 of the post frames 331 by the first handling robots 281.

In such a process, the first handling robots 281 may be moved in synchronization with the first movement member 321 without being separated from the hanger frames 211 of the side hangers 210. Thus, in the exemplary embodiment of the present disclosure, a process for separating arms of the first handling robots 281 from the hanger frames 211 and re-coupling the arms to the hanger frames 211 can be omitted.

Meanwhile, in the exemplary embodiment of the present disclosure, when the side assemblies 3 are moved to the opposite sides of the floor assembly 2 through the first movement member 321, the arms of the first handling robots 281 may be separated from the hanger frames 211.

When the arms of the first handling robots 281 are separated from the hanger frames 211, a driving source supplied to the side hangers 210 through the first handling robots 281 may be blocked.

Figure 10:
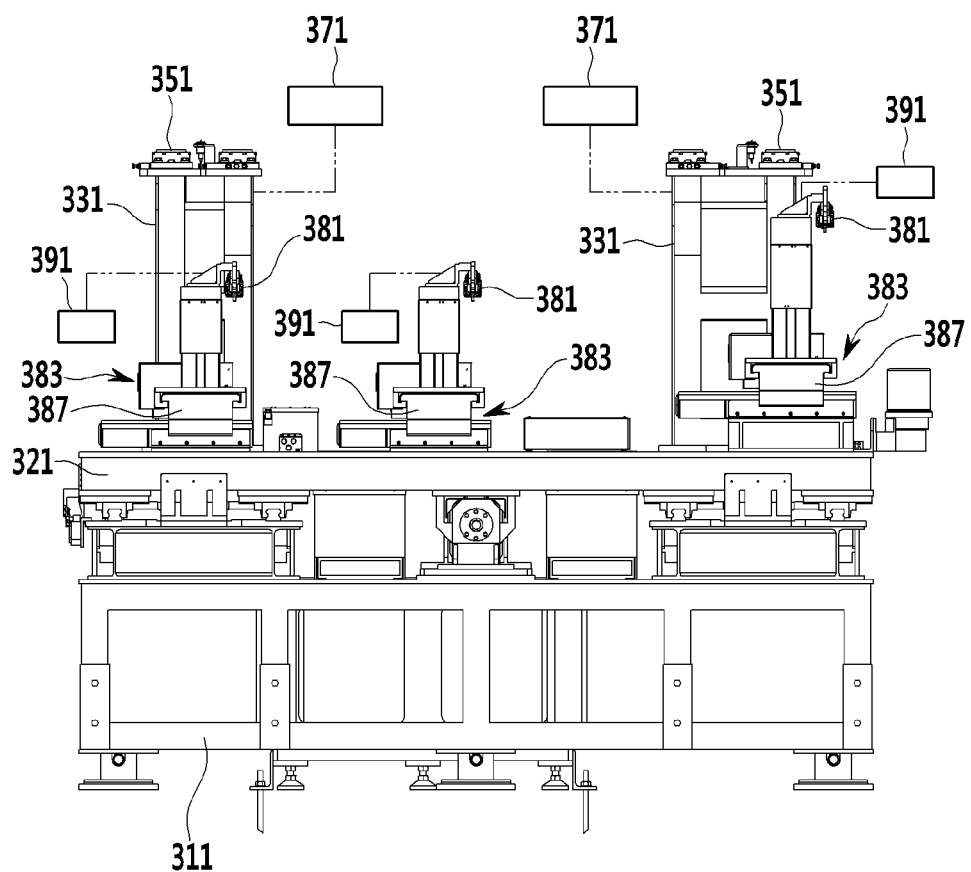
FIG. 10 is a front schematic diagram of the guide post applied to the pre-buck unit of the vehicle body assembling system according to the exemplary embodiment of the present disclosure.

Thus, as shown in FIG. 10, in the exemplary embodiment of the present disclosure, a driving source supply portion 371 that supplies a driving source to the side hanger 210 is provided in the post frame 331. Here, the driving source may include a power source, air pressure, a control signal, and the like for driving the first clamper 251 (see FIG. 5) of the side hanger 210. That is, the driving source supply portion 371 may include a feeding portion, an air supply portion, and a wireless communication portion.

Meanwhile, as shown in FIGS. 7 and 10, the guide post 310 according to the exemplary embodiment of the present disclosure further include a plurality of second clampers 381 that clamp the bottommost portion of the side assembly 3 while the side hangers 210 that control the side assemblies 3 are coupled to the hanger coupling portions 351 of the post frames 331.

Apart from the side hanger 210, the second clampers 381 are disposed at a distance from each other along the vehicle body transfer direction in the first movement member 321. The second clampers 381 may clamp a lower side seal of the side assembly 3.

Here, the second clampers 381 may be provided reciprocative to three axis directions (the vehicle body transfer direction, the vehicle width direction, and the height direction) by a fourth driver 383 corresponding to the side assembly 3, which is different according to a vehicle type.

The fourth driver 383 converts a rotation force of a servomotor to a linear movement, and the second clampers 381 may move reciprocative to the three axis directions through a fourth guide structure 387, which is a known structure that includes a lead (or a ball) screw that performs a linear movement by an air pressure cylinder, a cylinder rod, and a guide rail.

Such a fourth driver 383 is provided as a three-axis electric driver or a moving device which is well known in the field and therefore no further description will be provided.

Further, in the exemplary embodiment of the present disclosure, a first location sensor 391 is further included. The first location sensor 391 senses location of the side assembly 3, which is different according to a vehicle type, and controls the fourth driver 383 of the second clampers 381 according to a sense signal (see FIG. 10).

The first location sensor 391 is provided in the second clamper 381. For example, the first location sensor 391 may include a laser displacement sensor that irradiates a laser beam to an object to be sensed, receives a laser beam reflected from the object, and senses a location of the object.

Thus, in the exemplary embodiment of the present disclosure, a control signal is applied to the fourth driver 383 through a controller according to the sense signal of the first location sensor 391, and corrects a control location of the second clamper 381 corresponding to the side assembly 3, which is different according to a vehicle type, by changing the location of the second clamper 381 in the third axis directions.

Referring to FIG. 1, the first welding robots 410 weld the lower portions 4a of the side assemblies 3 disposed in regular portions at the opposite sides of the floor assembly 2 by the side hangers 210 and the guide posts 310 to the floor assembly 2.

The first welding robots 410 are provided in plural along the vehicle body transfer direction, and a spot welding device is provided in an arm front end of each robot.

Such a first welding robot 410 is provided as a spot welding robot, which is well known in the art, and therefore no further description will be provided.

Hereinafter, the main buck unit 500 of the vehicle body assembling system 100 according to the exemplary embodiment of the present disclosure will be described in detail.

Referring to FIGS. 1 and 2, the main buck unit 500 according to the exemplary embodiment of the present disclosure assembles vehicle body parts to the side assemblies 3 of the vehicle body, transferred to the main buck section 50 through the truck line 1. In this case, the side assemblies 3 are in a state of being pre-assembled and thus the lower portions 4a of the side assemblies 3 are pre-assembled to the floor assembly 2 by the pre-buck unit 200 in the pre-buck section 20.

That is, the main buck unit 500 controls the upper portion 4b (see FIG. 3) of the side assembly 3 in the main buck section 50, and welds the vehicle body parts to the upper portion 4b of the side assembly 3. Here, the vehicle body parts may include the cowl 7, the roof rail 8, and the package tray 9.

Such a main buck unit 500 is provided in opposite sides of the transfer path of the truck line 1 in the main buck section 50.

Figure 11:
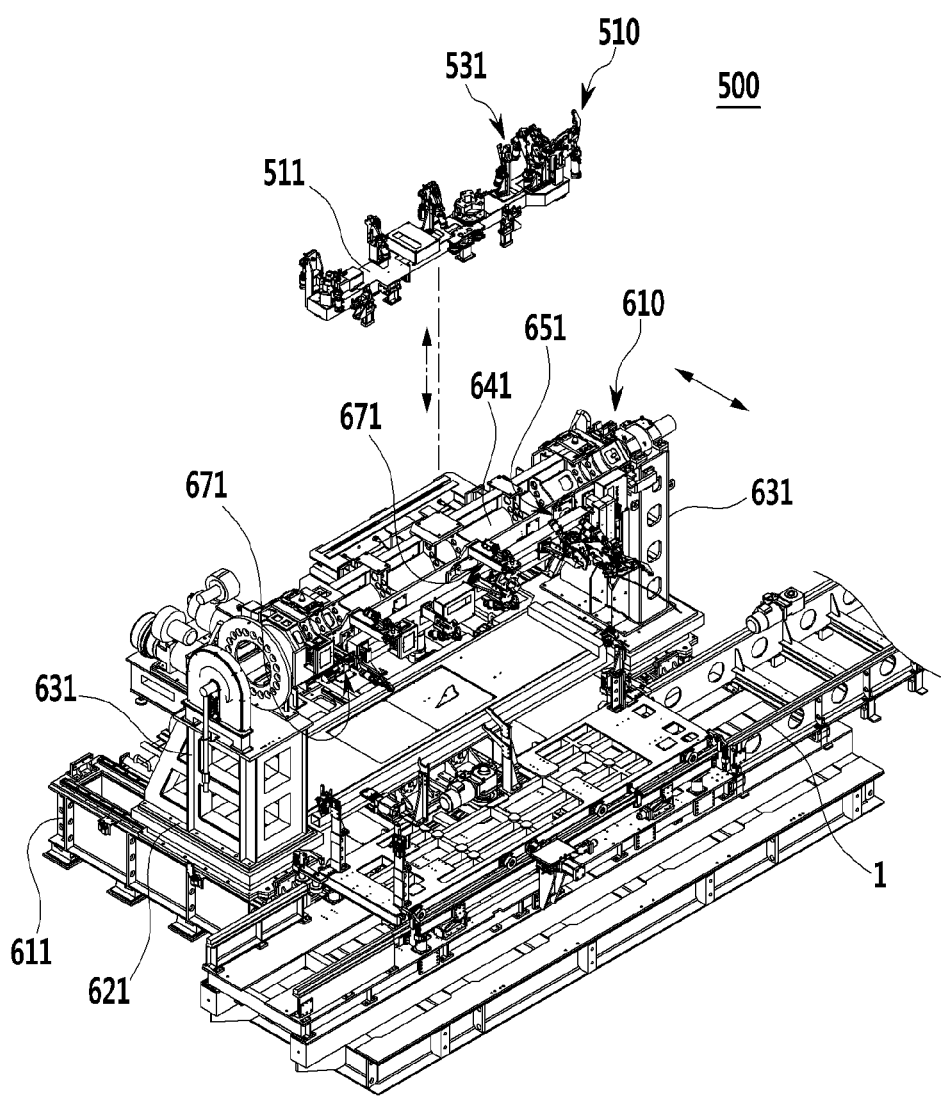
FIG. 11 is a perspective view of the main buck unit applied to the vehicle body assembling system according to the exemplary embodiment of the present disclosure.

FIG. 11 is a perspective view of the main buck unit applied to the vehicle body assembling system according to the exemplary embodiment of the present disclosure.

Referring to FIG. 11, along with FIGS. 1 and 2, the main buck unit 500 according to the exemplary embodiment of the present disclosure includes a side jig 510, a rotation index 610, a CRP loading portion 710, and a second welding robot 810 to control a vehicle width direction of the side assembly 3 and assemble the upper portion 4b of the side assembly 3 and the vehicle body parts.

In the exemplary embodiment of the present disclosure, the side jig 510 clamps or grips the upper portion 4b of the side assembly 3 and controls the vehicle width direction of the side assembly 3 in the main buck section 50. The side jig 510 is provided in plural corresponding to the side assemblies 3, which are different according to a vehicle type. In addition, the side jig 510 can be mounted to a second handling robot 581 in the main buck section 50, and may be detached from/attached to the rotation index 610 through the second handling robot 581.

Since the side jigs 510 are provided in plural corresponding to the side assembly 3 that is different depending on a type of the vehicle, a storage portion 910 is provided to store the side jigs 510 in the main buck section 50.

As described, the side jigs 510 stored in the storage portion 910 may be attached to/detached from the rotation index 610 through the second handling robot 581 according to the side assembly 3 that is different depending on a type of the vehicle.

Figure 12:
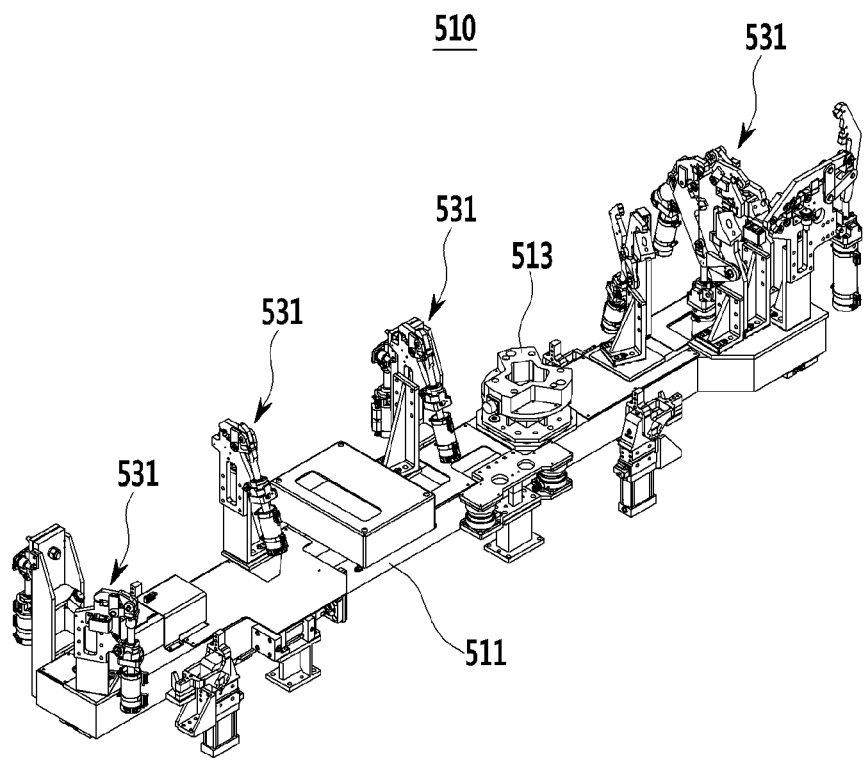
FIGS. 12 and 13 are perspective views of side jigs applied to the main buck unit of the vehicle body assembling system according to the exemplary embodiment of the present disclosure.
Figure 13:
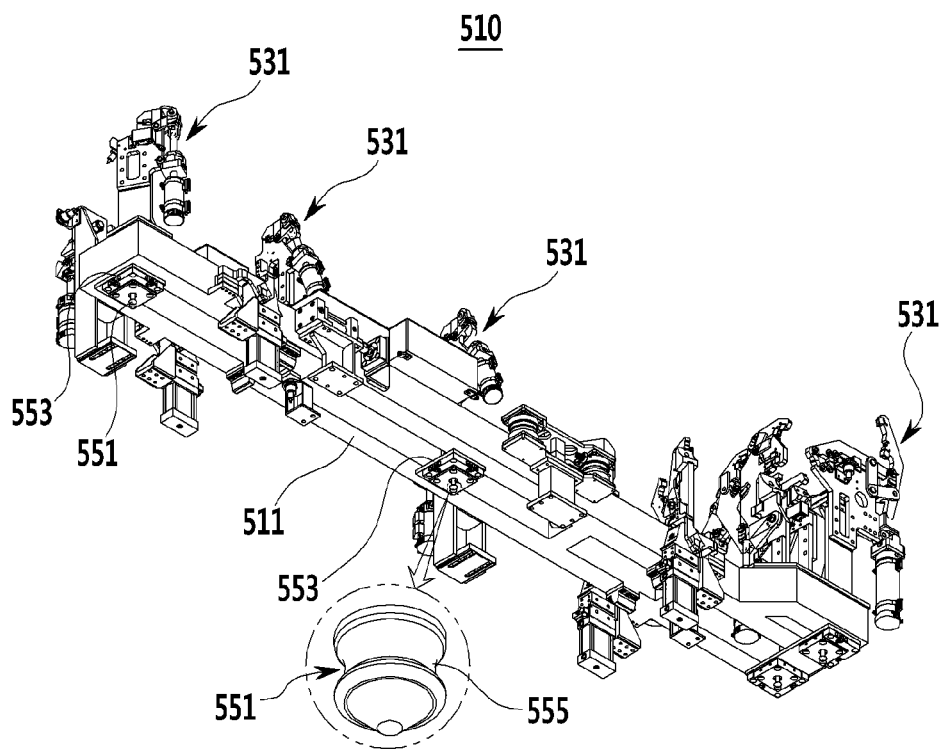

FIGS. 12 and 13 are perspective views of the side jig applied to the vehicle body assembling system according to the exemplary embodiment of the present disclosure.

Referring to FIGS. 11 to 13, the side jig 510 according to the exemplary embodiment of the present disclosure basically includes a jig frame 511, third clampers 531, and second coupling pins 551.

The jig frame 511 is mounted to an arm front end of each of the second handling robots 581 (see FIG. 1) disposed in the main buck section 50 (see FIG. 1). The jig frame 511 may be mounted to the arm front ends of the second handling robots 581 or may be separated therefrom through a tool changer 513.

The third clampers 531 are provided in the jig frame 511, and clamp the upper portions 4b of the side assemblies 3 and control the width direction of each side assembly 3 in the main buck section 50.

The third clampers 531 are respectively disposed at opposite end portions of the jig frame 511, and provided in plural between the opposite end portions of the jig frame 511. The third clampers 531 respectively disposed at the opposite end portions of the jig frame 511 may clamp a front side and a rear side (i.e., a rear combination lamp) of the upper portion 4b of the side assembly 3. In addition, the plurality of third clampers 531 disposed between the opposite end portions of the jig frame 511 may clamp a pillar side of the upper portion 4b of the side assembly 3.

The second coupling pin 551 couples the jig frame 511 to the rotation index 610, which will be described later. The second coupling pin 551 is provided in plural in the rear side of the jig frame 511. The second coupling pin 551 protrudes in the bottom direction of the jig frame 511 from the bottom of the jig frame 511 through a second installation bracket 553.

Such a second coupling pin 551 forms a round-shaped second ball coupling groove 555 along a circumferential direction in the cylindrical shape. A coupling structure of the second coupling pin 551 and the rotation index 610 will be described in detail later.

Figure 14:
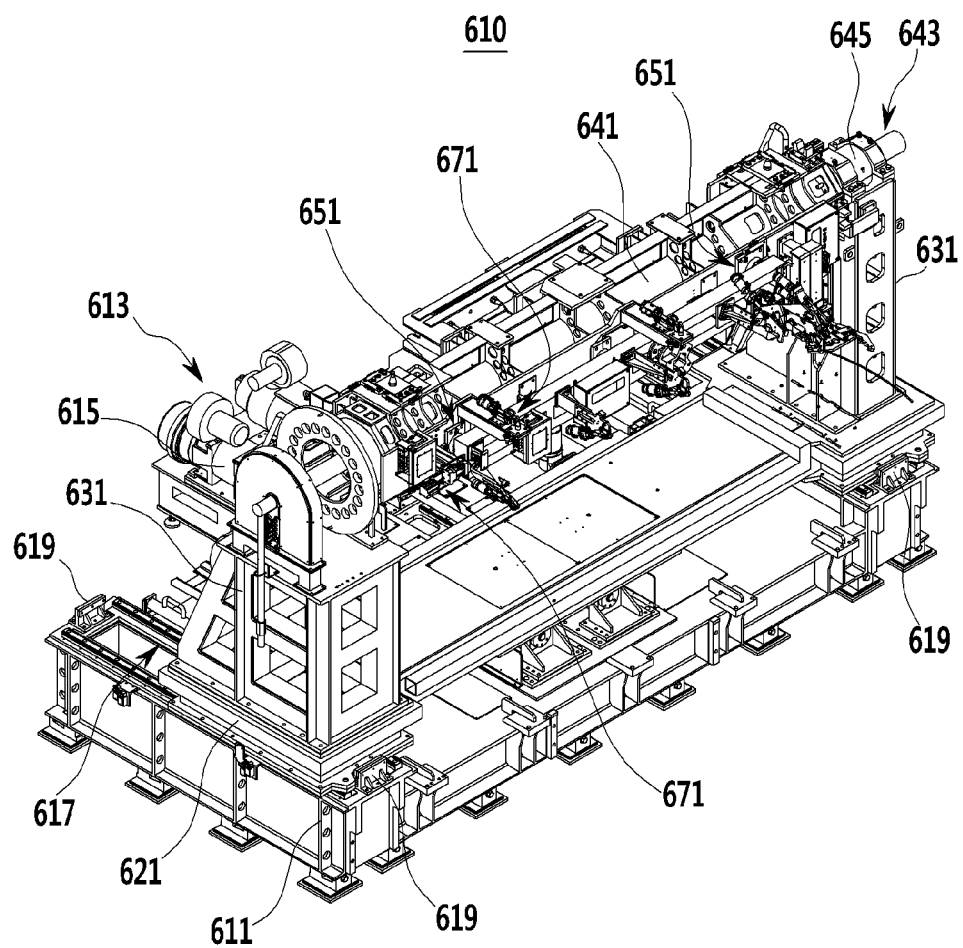
FIG. 14 is a perspective view of a rotation index applied to the main buck unit of the vehicle body assembling system according to the exemplary embodiment of the present disclosure.
Figure 15:
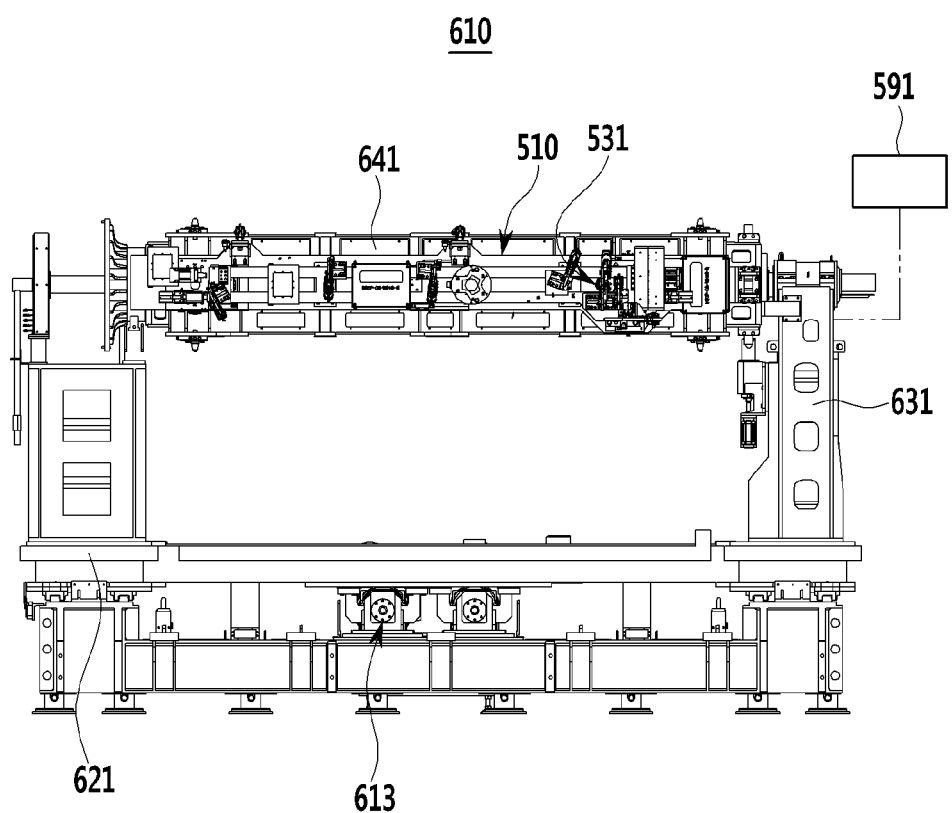
FIG. 15 is a schematic diagram of the rotation index applied to the main buck unit of the vehicle body assembling system according to the exemplary embodiment of the present disclosure.

FIG. 14 is a perspective view of the rotation index applied to the main buck unit of the vehicle body assembling system according to the exemplary embodiment of the present disclosure.

Referring to FIGS. 11 and 14, the rotation index 610 according to the exemplary embodiment of the present disclosure is coupled with the side jig 510 in order to control a regular position of the upper portion 4b of the side assembly 3 through the side jig 510 in the main buck section 50.

In addition, the rotation index 610 according to the exemplary embodiment of the present disclosure controls location variation of the side assembly 3 and minimizes assembly variation of the side assembly 3.

Further, the rotation index 610 of the exemplary embodiment of the present disclosure installs a plurality of side jigs 510 that correspond to the side assembly 3 that is different depending on a type of the vehicle, and controls the upper portion 4b of the side assembly 3 while rotatably selecting a side jig 510 of the corresponding type of the vehicle.

The rotation index 610 is provided to be rotatable by a predetermined angle by being coupled with the side jig 510 at opposite sides of the transfer path of the main buck section 50, and becomes reciprocatively movable along the vehicle width direction in a main buck frame 611.

Such a rotation index 610 includes a second movement member 621, an index frame 631, a rotator 641, a jig coupling portion 651, and a fourth clamper 671.

The second movement member 621 provided at opposite sides of the transfer path of the main buck section 50 can be reciprocatively movable along the vehicle width direction in the main buck frame 611 with respect to the side assemblies 3 of which the lower portions are pre-assembled to the floor assembly 2 through a fifth driver 513.

For example, the second movement members 621 are respectively formed in the shape of a plate, and they are reciprocatively movable along the vehicle width direction by the fifth driver 613 in the upper side of the main buck frame 611.

Here, the fifth driver 613 is provided to make the second movement members 621 reciprocatively movable along the vehicle width direction. The fifth driver 613 enables the second movement members 621 to be reciprocatively movable along the vehicle width direction through a fifth guide structure 617, which is a well-known structure in the art, and includes a lead (or a ball) screw that converts a rotation force of a fifth servomotor 615 to a linear movement, and a guide rail.

Such a fifth driver 613 is an electric driver or a moving device known in the art, and therefore no further detailed description will be provided.

Meanwhile, a second stopper 619 that determines a regular position of the second movement member 621 moving along the vehicle width direction by the fifth driver 613 may be provided in the main buck frame 611. The second stopper 619 may be provided in each of the opposite ends of the guide rail in the main buck frame 611.

The index frame 631 is provided as a pair to make the rotator 641, which will be described later, to be rotatable, and each of the pair of the index frames 631 is distanced from one another along the vehicle body transfer direction on the second movement members 621.

Such an index frame 631 is formed with a structure in which a plurality of metal bars are connected in the vehicle body transfer direction, the vehicle width direction, and the height direction, and therefore the index frames 631 may be perpendicularly provided on the second movement members 621 with a constant interval along the vehicle body transfer direction.

The rotator 641 is coupled with the side jig 510 that corresponds to the side assembly 3 that is different depending on a type of the vehicle through the second handling robot 581, and has four sides that can replace the side jig in a detachable manner and is rotatably provided in the index frame 631.

Opposite ends of the rotator 641 are rotatably supported by the index frames 631, and the rotator 641 may rotate by a predetermined angle (i.e., 90 degrees) through a sixth driver 643. For example, the sixth driver 643 includes a sixth servomotor 645 that is fixed to the index frame 631.

As shown in FIGS. 12 and 13, the jig coupling portion 651 is provided to couple the jig frame 511 of the side jig 510 to the rotator 641. The jig coupling portion 651 is provided in plural, and a plurality of jig coupling portions 651 are provided in each side of the rotator 641. The jig coupling portions 651 are coupled with the second coupling pins 551 provided in the jig frame 511 to clamp the second coupling pins 551.

Referring to FIGS. 12 and 13, along with FIGS. 8 and 9, the jig coupling portion 651 according to the exemplary embodiment of the present disclosure includes a second pin housing 653 and a second ball clamp 655.

The second pin housing 653 is provided to be fixed to each side of the rotator 641. The second coupling pin 551 of the side jig 510 is fitted into the second pin housing 653.

The second ball clamp 655 clamps the second coupling pin 551 fitted into the second pin housing 653 with a plurality of balls 656 and air pressure, and is provided in the second pin housing 653.

For example, the second ball clamp 655 includes a support race 657 that supports the balls 656 to be rollable, a pair of second race members 658 that are provided to be movable to the center of the second coupling pin 551 from an outer side of a circumferential direction of the second coupling pin 551, and a seventh driver 659 that supplies a driving pressure to the second race members 658.

The support race 657 is provided as a circular race that supports the balls 656 to be rollable, and the pair of second race members 658 press the balls 656 while moving to the center from the outer side of the circumferential direction of the second coupling pin 551.

In addition, the seventh driver 659 provides air pressure to the second race member 658, and thus is provided as an air supply source that presses the balls 656 while moving the second race member 658 to the center of the second coupling pin 551 from the outer side of the circumferential direction of the second coupling pin 551.

As shown in FIG. 8, when the second coupling pin 551 is not coupled to the second pin housing 653, air pressure is not supplied to the second race member 658 through the seventh driver 659 such that the balls 656 maintain a free-rollable state on the support race 657.

Further, as shown in FIG. 9, when the second coupling pin 551 is coupled to the second coupling pin 551, the second race member 658 is supplied with air pressure through the seventh driver 659 such that the second race member 658 moves to the center from the outer side of the circumferential direction of the second coupling pin 551 and presses the balls 656 on the support race 657.

Thus, the balls 656 are coupled to the second ball coupling grooves 555 by the second race 656, such that the second coupling pin 551 can be firmly fixed to the second pin housing 653.

Therefore, in the exemplary embodiment of the present disclosure, the second coupling pin 551 of the side jig 510 is clamped by the jig coupling portion 651 using a ball clamp method such that the side jig 510 can be coupled to each side of the rotator 641.

The jig coupling portion 651 may be provided with a triangle structure in the rotator 641 so as to more stably couple the side jig 510 to the rotator 641.

As shown in FIGS. 11 and 14, the fourth clamper 671 is provided in plural in each side of the rotator 641 so as to fix the side jigs 510 to the rotator 641.

The fourth clampers 671 are provided at opposite sides in each side of the rotator 641. For example, the fourth clamper 671 moves back and forth by a pneumatic cylinder, and may be provided as a pin clamber that can be pin-coupled to the jig frame 511 of the side jig 510.

Meanwhile, a second location sensor 591 is further included in the exemplary embodiment of the present disclosure. The second location sensor 591 senses a location of the side assembly 3 while the upper portion of the side assembly 3 is controlled by the third clambers 531 of the side jig 510 after moving the rotator 641 coupled with the side jig 510 to the side assembly 3.

The second location sensor 591 is provided as a location sensor that senses a location of the side assembly 3 and controls the fifth driver 613 of the second movement member 621 according to a sense signal, and is provided in the index frame 631.

For example, the second location sensor 591 may include a laser displacement sensor that irradiates a laser beam to an object to be sensed, receives a laser beam reflected by the object, and senses a location of the object.

In the exemplary embodiment of the present disclosure, while the upper portion of the side assembly 3 is controlled by the third clampers 531 of the side jig 510, the location of the side assembly 3 is sensed by the second location sensor 591 and a sense signal is output to a controller (not shown in the drawing).

Thus, in the exemplary embodiment of the present disclosure, a control signal is applied to the fifth driver 631 through the controller according to the sense signal of the second location sensor 591, and the second movement member 621 is moved in the vehicle width direction to thereby correct a position of the side assembly 3.

Alternatively, the second location sensor 591 may be provided in the third clamper 531 of the side jig 510 instead of being provided in the index frame 631.

Figure 16:
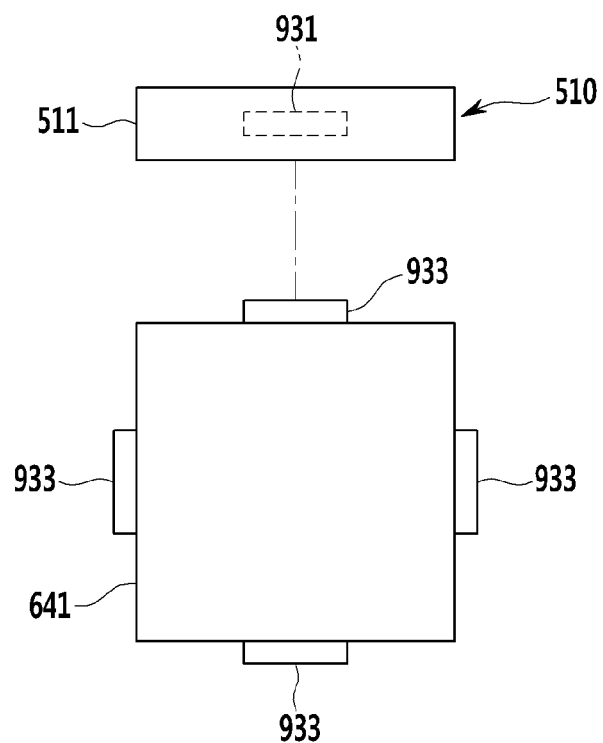
FIG. 16 schematically shows a vehicle type recognition system of the side jig applied to the main buck unit of the vehicle body assembling system according to the exemplary embodiment of the present disclosure.

As shown in FIG. 16, a vehicle type tag 931 is provided in the jig frame 511 of the side jig 510, and a tag reader 933 may be provided in each side of the rotator 641.

The vehicle type tag 931 stores information on a type of the vehicle with respect to each side jig 510 because a plurality of side jigs 510 are provided respectively corresponding to side assemblies 3 that are different depending on a type of the vehicle. The tag reader 933 recognizes the information on a type of the vehicle with respect to each side jig 510 through the controller.

Referring to FIG. 2, in the exemplary embodiment of the present disclosure, a CRP loading portion 710 transfers vehicle body parts that include the cowl 7, the roof rail 8, and the package tray 9 to the upper portion 4*b* of the side assembly 3, and places the transferred parts in the upper portion 4*b* of the side assembly 4*b*. Here, the CRP is a combination of C representing the cowl, R representing the roof rail, and P representing the package tray.

The CRP loading portion 710 is provided in an upper side of the transfer path of the truck line 1 to be moveable along the transfer path, and can be elevated with respect to the upper side of the side assembly 3 in the main buck section 50.

The CRP loading portion 710 includes various clamping devices and control devices to control locations of the cowl 7, the roof rail 8, and the package tray 9, and to clamp the cowl 7, the roof rail 8, and the package tray 9.

Referring back to FIGS. 1 and 2, the second welding robot 810 according to the exemplary embodiment of the present disclosure welds the cowl 7, the roof rail 8, and the package tray 9 to the upper portion 4*b* of the side assembly 3.

The second welding robot 810 welds the vehicle body parts (i.e., the cowl 7, the roof rail 8, and the package tray 9) and the upper portion 4*b* of the side assembly 3 while the upper portion 4*b* of the side assembly 3 are controlled by the side jig 510 and the rotation index 610 and the vehicle body parts are located in the regular positions in the upper portion 4*b* of the side assembly 3 by the CRP loading portion 710.

The second welding robot 810 is provided in plural along the vehicle body transfer direction in the main buck section 50, and a spot welding device is provided in an arm front end of each robot. Such a second welding robot 810 is provided as a spot welding robot, which is well known in the art, and therefore no further description will be provided.

Hereinafter, an operation and a vehicle body assembly process of the vehicle body assembling system 100 according to the exemplary embodiment of the present disclosure will be described in detail with reference to the above-stated drawings.

First, the floor assembly 2 assembled in the subassembly line is transferred to the pre-buck section 20 among a predetermined transfer path through the truck line 1.

In the pre-buck section 20, the side hanger 210 of the pre-buck unit 200 is in a state of being mounted to the front end of the arm of the first handling robot 281. In addition, the guide post 310 of the pre-buck unit 200 is in a state of being moved backward in a direction (i.e., the vehicle width direction) that is away from the floor assembly 2 at the opposite sides of the transfer path by the second driver 313.

The side assembly 2 that is different depending on a type of the vehicle is transferred to the pre-buck section 20 through the transfer hander 110, and in the exemplary embodiment of the present disclosure, the side assembly 2 is unloaded from the transfer hanger 110 through the robot hanger 290.

The robot hanger 290 clamps the side assembly 3 while the side assembly 3 is aligned in a predetermined location using the alignment jig 293. In this case, in the exemplary embodiment of the present disclosure, the side assembly 3 is loaded to the side hanger 210 by the robot hanger 290 using a robot-to-robot method.

Here, the reference pin 231 of the side hanger 210 is fitted into the reference hole 6 of the side assembly 3 to set a reference location of the side assembly 3. In addition, the first clampers 251 of the side hanger 210 clamp the lower portion 4*a* of the side assembly 3.

In this case, the first clampers 251 provided at the opposite sides of the hanger frame 211 of the side hanger 210 clamp a front side and a rear side (i.e., a rear combination lamp) of the side assembly 3.

In addition, the plurality of first clampers 251 provided between the opposite ends of the hanger frame 211 respectively clamp the front pillar 5*a*, the center pillar 5*b*, and the rear pillar 5*c* of the side assembly 3.

In this case, the plurality of first clampers 251 provided between the opposite ends of the hanger frame 211 respectively clamp the front pillar 5*a*, the center pillar 5*b*, and the rear pillar 5*c* of the side assembly 3 while being moved in the vehicle body transfer direction by the first driver 253 according to locations of the pillars of the side assembly 3 that is different depending on a type of the vehicle.

In the exemplary embodiment of the present disclosure, the first clamper 251 may be additionally provided in the installation left side 261 of the hanger frame 211 corresponding to the side assembly 3 that is different depending on a type of the vehicle.

In such a state, the side hanger 210 that controls the side assembly 3 is transferred to the guide post 310 by the first handling robot 281 in the exemplary embodiment of the present disclosure.

Next, in the exemplary embodiment of the present disclosure, the first coupling pin 271 provided in the hanger frame 211 is coupled to the hanger coupling portion 351 of the post frame 331 such that the side hanger 210 is coupled to the post frame 331 of the post 210 using the first handling robot 281.

More specifically, before the first coupling pin 271 is coupled to the first pin housing 353 of the hanger coupling portion 351, the first race member 358 is not supplied with air pressure through the third driver 359 in the first ball clamp 355 of the hanger coupling portion 351, and in this case, the balls 356 are in the free-rollable state on the support race 357.

In this case, when the first coupling pin 271 is coupled to the first pin housing 353, air pressure is supplied to the first race member 358 through the third driver 359 in the exemplary embodiment of the present disclosure.

Then, the first race member 358 moves to the center of the first coupling pin 271 from the outer side of the circumferential direction of the first coupling pin 271 by the air pressure such that the balls 356 on the support race 357 are pressed.

Here, the balls 356 are coupled to the ball coupling groove 275 of the first coupling pin 271 by the first race member 358, and the first coupling pin 271 is fixed to the first pin housing 353.

Thus, in the exemplary embodiment of the present disclosure, the first coupling pin 271 of the side hanger 210 is clamped by the hanger coupling portion 351 using a ball clamp method such that the side hanger 210 can be coupled to the post frame 331.

While the side hanger 210 that controls the side assembly 3 is coupled to the hanger coupling portion 351 of the post frame 331, the lower side seal of the side assembly 3 is clamped by the second clampers 381 on the first movement member 321 in the exemplary embodiment of the present disclosure.

Here, the second clampers 381 can clamp the lower side seal of the side assembly 3 while moving in the three axis directions of the vehicle body transfer direction, the vehicle width direction, and the height direction by the fourth driver 383 corresponding to the side assembly 3 that is different depending on a type of the vehicle.

In this case, a location of the side assembly 3 is sensed by the first location sensor 391 and a sense signal is output to the controller in the exemplary embodiment of the present disclosure. Then, in the exemplary embodiment of the present disclosure, the location of the second clamper 381 is changed in three axis directions while applying the control signal to the fourth driver 383 through the controller according to the sense signal of the first location sensor 391 such that the locations of the second clampers 381 can be corrected corresponding to the side assembly 3 that is different depending on a type of the vehicle.

Next, in the exemplary embodiment of the present disclosure, the first movement member 321 of the guide post 310 is moved toward the opposite sides of the floor assembly 2 along the vehicle width direction by driving of the second driver 313.

That is, in the exemplary embodiment of the present disclosure, the side assemblies 3 controlled by the side hanger 210 coupled to the post frame 331 on the first movement member 321 and the second clampers 381 on the first movement member 321 are moved to the opposite sides of the floor assembly 2 by the first movement members 321.

In such a process, the first handling robots 281 may be synchronized with the first movement members 321 rather than separating the arms of the first handling robots 281 from the hanger frame 211 of the side hanger 210 in the exemplary embodiment of the present disclosure.

Alternatively, in the exemplary embodiment of the present disclosure, the arms of the first handling robots 281 may be separated from the hanger frame 211. In such a case, the driving source supply 371 provided in the post frame 331 supplies a driving source such as power, air pressure, and a control signal to the first clampers 251 of the side hanger 210.

In the exemplary embodiment of the present disclosure, the side assemblies 3 can be precisely matched to the opposite sides of the floor assembly 2 while moving the side assemblies 3 to the opposite sides of the floor assembly 2 using the guide post 310.

Further, in the exemplary embodiment of the present disclosure, location variation of the side assembly 3, which may occur while the first handling robot 281 is handling the side hanger 210 that controls the side assembly 3, can be controlled by the guide post 310 such that the location variation of the side assemblies 3 with respect to the opposite sides of the floor assembly 2 can be minimized.

Thus, in the exemplary embodiment of the present disclosure, the lower portion 4a of the side assembly 3 can be placed in the regular position at each of the opposite sides of the floor assembly 2 while controlling the vehicle body transfer direction and the height direction of the side assembly 3 with the side hanger 210 and the second clampers 381.

In such a state, in the exemplary embodiment of the present disclosure, the lower portions 4a of the side assemblies 3 are pre-assembled to the opposite sides of the floor assembly 2 by welding the lower portions 4a of the side assemblies 4 to the floor assembly 2 using the first welding robots 410.

The lower portions 4a of the side assemblies 3 are pre-assembled to the opposite sides of the floor assembly 2 in the pre-buck unit 200 through the pre-buck section 20 through such a series of processes, and then the pre-assembled vehicle body is transferred to the main buck section 50 along the transfer path of the truck line 1 in the exemplary embodiment of the present disclosure.

In the exemplary embodiment of the present disclosure, the plurality of side jigs 510 that correspond to the side assembly 3 that is different depending on a type of the vehicle are stored in the storage portion 910 in the main buck section 50.

In addition, the side jig 510 that corresponding to the side assembly 3 that is different depending on a type of the vehicle is coupled to each side of the rotator 641 in the rotation index 610 of the main buck unit 500 in the main buck section 50. Here, the rotation index 610 is in a state of being moved backward in a direction (i.e., the vehicle width direction) that is away from the pre-assembled vehicle body by the fifth driver 613 at the opposite sides of the transfer path.

As described, when the pre-assembled vehicle body is transferred to the main buck section 50 from the pre-buck section 20, the rotator 641 of the rotation index 610 is rotated to place the side jig 510 of the corresponding vehicle type that corresponds to the side assembly 3 that is different depending on a type of the vehicle to the side assembly 3 of the pre-assembled vehicle body in the exemplary embodiment of the present disclosure.

Next, in the exemplary embodiment of the present disclosure, the second movement member 621 of the rotation index 610 is moved toward the side assembly 3 along the vehicle width direction by driving the fifth driver 613.

That is, in the exemplary embodiment of the present disclosure, the rotator 641 on which the side jig 510 is mounted, while being supported by the index frame 631 on the second movement member 621, is moved toward the side assembly 3 by the second movement member 621.

Next, in the exemplary embodiment of the present disclosure, the vehicle width direction of the side assembly 3 is controlled while clamping the upper portion 4b of the side assembly 3 using the third clampers 531 of the side jig 510.

Here, the third clampers 531 provided at the opposite ends of the jig frame 511 of the side jig 510 clamp the front side and the rear side (i.e., rear combination lamp) of the upper portion 4b of the side assembly 3. In addition, the plurality of third clampers 531 provided between the opposite ends of the jig frame 511 clamp the pillars of the upper portion 4b of the side assembly 3.

In this case, in the exemplary embodiment of the present disclosure, the second location sensor 591 senses a location of the side assembly 3 and outputs a sense signal to the controller. Then, in the exemplary embodiment of the present disclosure, a control signal is applied to the fifth driver 613 through the controller according to the sense signal of the second location sensor 591, and the second movement member 621 is moved in the vehicle width direction such that the location of the side assembly 3 can be corrected.

Next, in the exemplary embodiment of the present disclosure, the CRP loading portion 710 transferred to the main buck section 50 along the transfer path of the truck line 1 from the upper side of the transfer path is lowered to the upper side of the side assembly 3.

The CRP loading portion 710 is lowered to the upper side of the side assembly 3 while controlling the vehicle body parts, such as the cowl 7, the roof rail 8, and the package tray 9. Thus, the cowl 7, the roof rail 8, and the package tray 9 are located in the upper portion 4b of the side assembly 3 by the CRP loading portion 710.

In such a state, the vehicle body parts and the upper portion 4b of the side assembly 3 are welded by the second welding robot 810 in the exemplary embodiment of the present disclosure.

Meanwhile, in the exemplary embodiment of the present disclosure, the side jig 510 coupled to the rotator 641 may be replaced with a side jig 510 that corresponds to a side assembly 3 of a different type of the vehicle.

In this case, in the exemplary embodiment of the present disclosure, when the vehicle body parts and the upper portion 4b of the side assembly 3 are welded by the second welding robot 810, the side jig 510 coupled to the upper side of the rotator 641 may be replaced with another side jig 510 corresponding to a side assembly 3 of a different type of the vehicle using the second handling robot 581.

In the exemplary embodiment of the present disclosure, while the side jig 510 coupled to the upper side of the rotator 641 is separated from the rotator 641 by the second handling robot 581 or the side jig 510 is not coupled to the upper side of the rotator 641, a different side jig 510 is coupled to the upper side of the rotator 641 by the second handling robot 581. In the exemplary embodiment of the present disclosure, the second coupling pin 551 provided in the jig frame 511 of the side jig 510 is coupled to the jig coupling portion 651.

More specifically, before the second coupling pin 551 is coupled to the second pin housing 653 of the jig coupling portion 651, the second race member 658 is not supplied with air pressure through the seventh driver 659, and in this case, the balls 656 are in the free-rollable state on the support race 657.

In such a state, when the second coupling pin 551 is coupled to the second pin housing 653, the air pressure is supplied to the second race member 658 by the seventh driver 659 in the exemplary embodiment of the present disclosure. Then, the second race member 658 moves to the center of the second coupling pin 51 from the outer side of the circumferential direction of the second coupling pin 551 by the air pressure such that the balls 656 on the support race 657 are pressed.

Here, the balls 656 are coupled to the second ball coupling grooves 555 of the second coupling pin 551 by the second race members 658, and thus the second coupling pin 551 is fixed to the second pin housing 653.

Thus, in the exemplary embodiment of the present disclosure, the second coupling pin 551 of the side jig 510 can be clamped by the jig coupling portion 651 that uses a ball clamp method such that the side jig 510 can be coupled to the upper side of the rotator 641.

Further, in the exemplary embodiment of the present disclosure, while the side jig 510 is coupled to the rotator 641 by the jig coupling portion 651, the jig frame 511 of the side jig 510 is fixed to the rotator 641 by the fourth clampers 671 provided in the rotator 641. The fourth clamper 671 is pin-coupled to the jig frame 511 of the side jig 510 by the pneumatic cylinder, and fixes the jig frame 511 to the rotator 641.

As described, in the exemplary embodiment of the present disclosure, the upper portion 4b of the side assembly 3 and the vehicle body parts are assembled in the main buck unit 500 in the main buck section 50.

Figure 17:
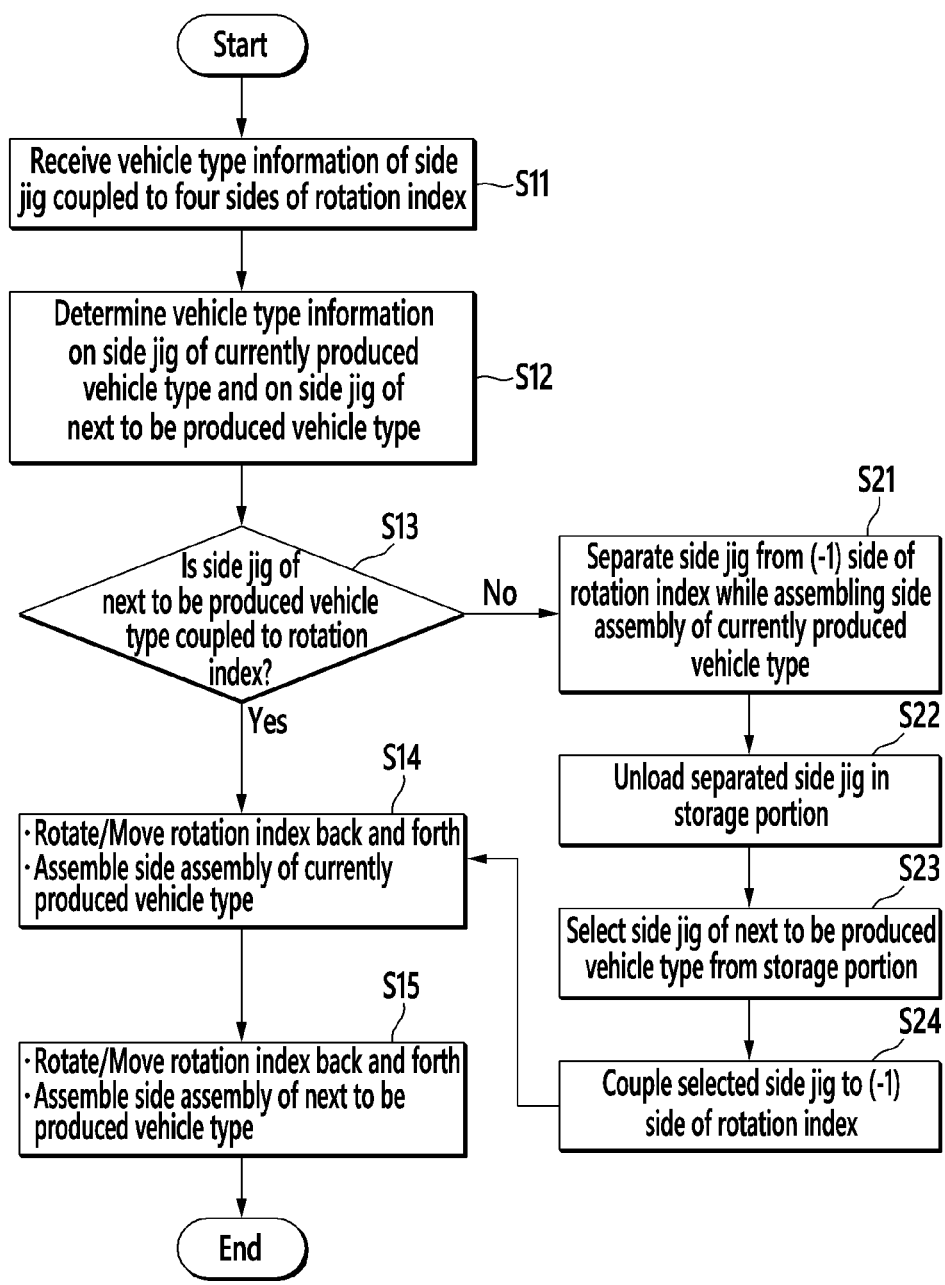
FIG. 17 is a flowchart describing a control method of the main buck unit of the vehicle body assembling system according to the exemplary embodiment of the present disclosure.

In such a series of processes, a control process corresponding to multiple vehicle types of the replaceable side jig 510 with respect to the rotator 641 will be described in further detail with reference to FIG. 17. Specifically, the tag reader 933 provided in each side of the rotator 641 receives vehicle type information stored in the vehicle type tag 931 of the side jig 510 and outputs the corresponding vehicle type information to the controller (S11). In addition, in the exemplary embodiment of the present disclosure, vehicle type information on a side jig 510 of a type of a vehicle that is being produced and vehicle type information on a side jig 510 that corresponds to a type of the next vehicle to be produced are determined (S12).

Next, the controller determines whether or not a side jig that corresponds to the type of the next vehicle to be produced is coupled to the upper side of the rotator 641 (S13).

Here, if the controller determines that the side jig 510 of the type of the next vehicle to be produced is coupled to the rotator 641, the side assembly 3 of the type of the vehicle that is currently produced and a side assembly 3 of the type of the next vehicle to be produced are assembled by rotating the rotator 641 and moving the rotator 641 back and forth by using the rotation index 610 in the exemplary embodiment of the present disclosure (S14 and S15).

If, in S13, the controller determines that that the side jig 510 of the type of the next vehicle to be produced is not coupled to the rotator 641, the side jig 510 coupled to an upper side (i.e., (−1) side) of the rotator 641 (S21) and the separated side jig 510 is unloaded in the storage portion 910 (S22) in assembly of the side assembly 3 of the type of the vehicle that is currently produced according to the exemplary embodiment of the present disclosure.

Next, in the exemplary embodiment of the present disclosure, a side jig 510 of a type of the next vehicle to be produced is selected from the storage portion 910 (S23), and the side jig 510 of the type of the next vehicle to be produced is coupled to the upper side of the rotator 641 (S24) by moving the rotator 641 backward after the side assembly 3 of the type of the vehicle that is currently produced is assembled.

According to the exemplary embodiment of the present disclosure, the vehicle body assembling system 100 can pre-assemble the lower portion 4a of the side assembly 3 to the floor assembly 2 using the pre-buck unit 200 in the pre-buck section 20 and then assemble the upper portion 4b of the side assembly 3 and the vehicle body parts using the main buck unit 500 in the main buck section.

According to the exemplary embodiments of the present disclosure, at least five or more types of vehicles can be assembled by separating a vehicle body assembly process into two processes rather than forming a frame of a vehicle body through a single process as in a conventional art, and various types of vehicles can be commonly produced by using robots.

Thus, various types of vehicles can be flexibly produced, equipment preparation time can be reduced, the entire equipment can be light-weight and simplified, and initial investment cost and additional investment cost due to addition of different types of vehicles can be saved according to the exemplary embodiments of the present disclosure.

While this disclosure has been described in connection with what is presently considered to be practical exemplary embodiments, it is to be understood that technical aspects of the present disclosure are not limited to the exemplary embodiments suggested in the specification, but, although a person of ordinary skill in this field of art who understands the technical aspects of the present disclosure can suggest another exemplary embodiment by modifications, changes, removal, and addition of constituent elements within a range of technical aspects that are the same as in the present disclosure, it will also be within a range of right of the present disclosure.

What is claimed is:

1. A method for controlling a main buck unit in a vehicle body assembling system, comprising:
    receiving, by a tag reader, vehicle type information of side jigs coupled to four sides of a rotation index;
    determining, by a controller, whether a side jig that corresponds to a type of a next vehicle to be produced in addition to a side jig of a type of a vehicle that is currently produced is coupled to the rotation index;
    determining that the side jig of the type of the next vehicle to be produced is not coupled to the rotation index, and separating a side jig mounted to an upper side of the rotation index and unloading the separated side jig in a storage portion in assembling of a side assembly of the type of the vehicle that is currently produced; and
    selecting, by the controller, the side jig of the type of the next vehicle to be produced from the storage portion, and coupling the selected side jig to the upper side of the rotation index when the rotation index is moved backward after finishing assembly of the side jig of the type of the vehicle that is currently produced.

2. The method for controlling the main buck unit of claim 1, further comprising determining that the side jig of the type of the next vehicle to be produced is coupled to the rotation index, the side assembly of the type of the vehicle that is currently produced and a side assembly of the type of the next vehicle to be produced are assembled by rotating the rotation index and moving the rotation index back and forth.

3. The method for controlling the main buck unit of claim 1, wherein a tag reader provided in each side of the rotation index receives vehicle type information stored in a vehicle type tag provided in each side jig.

* * * * *